US012651600B1

(12) United States Patent
Rai et al.

(10) Patent No.: US 12,651,600 B1
(45) Date of Patent: Jun. 9, 2026

(54) ADAPTIVE SIGNAL-TO-EVENT CONVERSION PLATFORM

(71) Applicant: ExlService Holdings, Inc., New York, NY (US)

(72) Inventors: Sachidanand Rai, New Delhi (IN); Ashutosh Sidana, Noida (IN); Swagat Panda, Angul (IN); Sujit Sahoo, Lawrenceville, NJ (US); Sanjay Pathak, Noida (IN); Shankar Kamra, Noida (IN); Ankur Gupta, Noida (IN); Ratnesh Chandra, Noida (IN); Ankush Jain, Delhi (IN); Sonu Bandhan, Noida (IN); Jignesh Vyas, Noida (IN)

(73) Assignee: ExlService Holdings, Inc., New York, NY (US)

( * ) Notice: Subject to any disclaimer, the term of this patent is extended or adjusted under 35 U.S.C. 154(b) by 0 days.

(21) Appl. No.: 19/302,867

(22) Filed: Aug. 18, 2025

(51) Int. Cl.
*G10L 15/26* (2006.01)
*G10L 15/22* (2006.01)
*G06F 16/334* (2025.01)

(52) U.S. Cl.
CPC .............. *G10L 15/22* (2013.01); *G10L 15/26* (2013.01); *G06F 16/3344* (2019.01)

(58) Field of Classification Search
CPC ............................. G10L 15/26; G06F 16/3344
See application file for complete search history.

(56) References Cited

U.S. PATENT DOCUMENTS

| | | | |
|---|---|---|---|
| 2016/0358094 A1* | 12/2016 | Fan | G06F 16/3344 |
| 2019/0370629 A1* | 12/2019 | Liu | G06N 5/041 |
| 2022/0005478 A1* | 1/2022 | Mclean | G10L 15/26 |

* cited by examiner

*Primary Examiner* — Feng-Tzer Tzeng
(74) *Attorney, Agent, or Firm* — Perkins Coie LLP

(57) ABSTRACT

Systems and methods are disclosed comprising techniques for signal conversion, such as monitoring digital communications signal data transmitted among a user set, converting signal data of a first discrete signal chunk into a first alphanumeric signal set, inputting the first alphanumeric signal set into a machine learning model to generate a first scoring distribution that maps to a first signal event category set, retrieving, for a second discrete signal chunk, a second alphanumeric signal set and a second scoring distribution that maps to a second signal event category set, determining a signal event divergence score via comparing the first and the second scoring distributions, and when the signal event divergence score fails to satisfy a tolerance threshold, transmitting, to at least one user of the user set, an interventive action that, when executed by the at least one user, causes a transformation of the digital communications signal data.

20 Claims, 8 Drawing Sheets

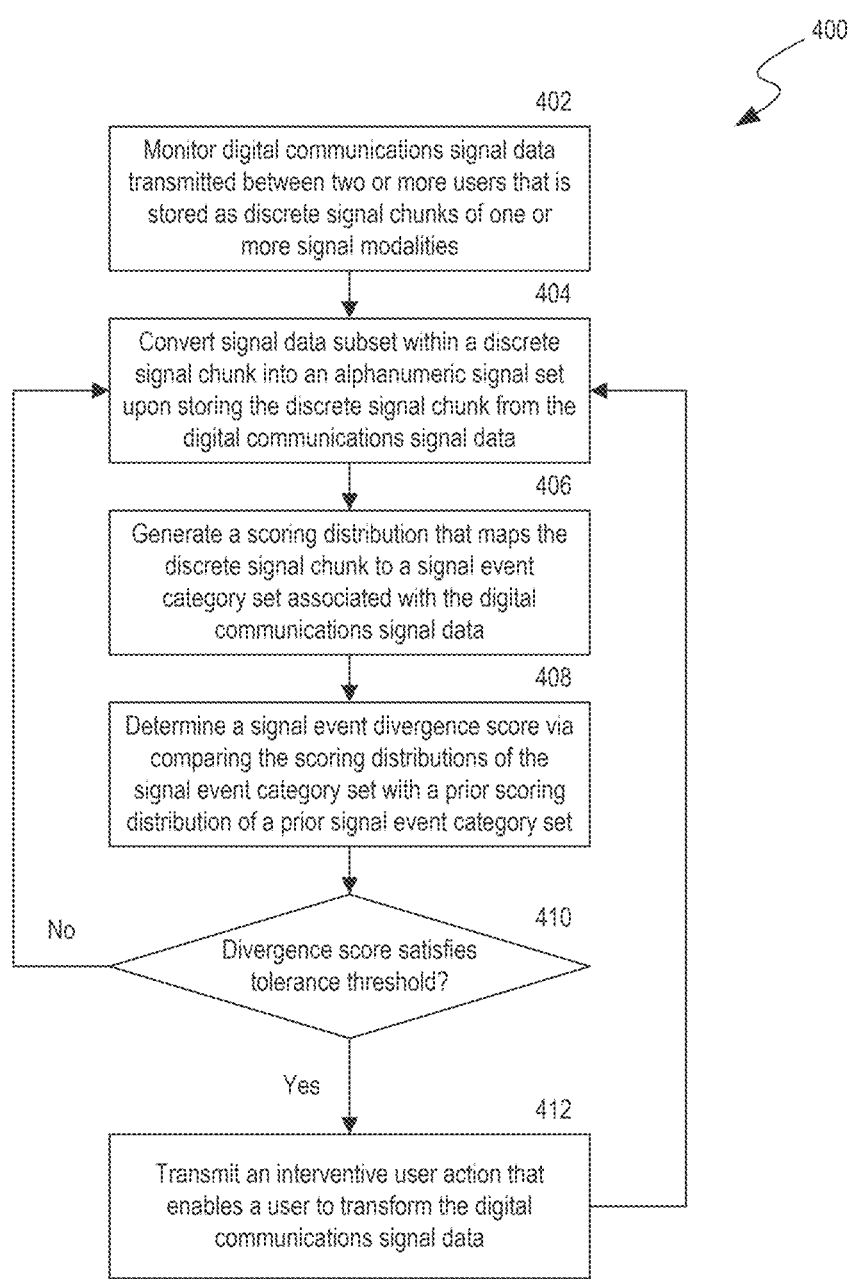

400

402
Monitor digital communications signal data transmitted between two or more users that is stored as discrete signal chunks of one or more signal modalities 404
Convert signal data subset within a discrete signal chunk into an alphanumeric signal set upon storing the discrete signal chunk from the digital communications signal data 406
Generate a scoring distribution that maps the discrete signal chunk to a signal event category set associated with the digital communications signal data 408
Determine a signal event divergence score via comparing the scoring distributions of the signal event category set with a prior scoring distribution of a prior signal event category set 410
Divergence score satisfies tolerance threshold?

No

Yes

412
Transmit an interventive user action that enables a user to transform the digital communications signal data

*FIG. 4*

ADAPTIVE SIGNAL-TO-EVENT CONVERSION PLATFORM

BACKGROUND

Transcription software plays an important role in converting human speech into text transcripts, offering both manual and automatic methods. In manual transcription, transcriptionists replay audio or video recordings multiple times in a transcription editor, typing out what they hear. This process can be time-consuming but often yields high accuracy. Automatic transcription, on the other hand, uses advanced technologies to quickly generate transcripts, although these may require editing for precision. Transcription software typically includes features like playback controls, typing interfaces, and formatting tools to facilitate efficient work. Its applications span various industries, including media, academia, and business, for purposes such as interview transcription, lecture notes, podcast captions, and meeting records.

BRIEF DESCRIPTION OF THE DRAWINGS

Detailed descriptions of implementations of the present invention will be described and explained through the use of the accompanying drawings.

FIG. 4 is a flow diagram that illustrates an example process for mapping converted signal data to events in accordance with some implementations of the disclosed technology.

Figure 1:
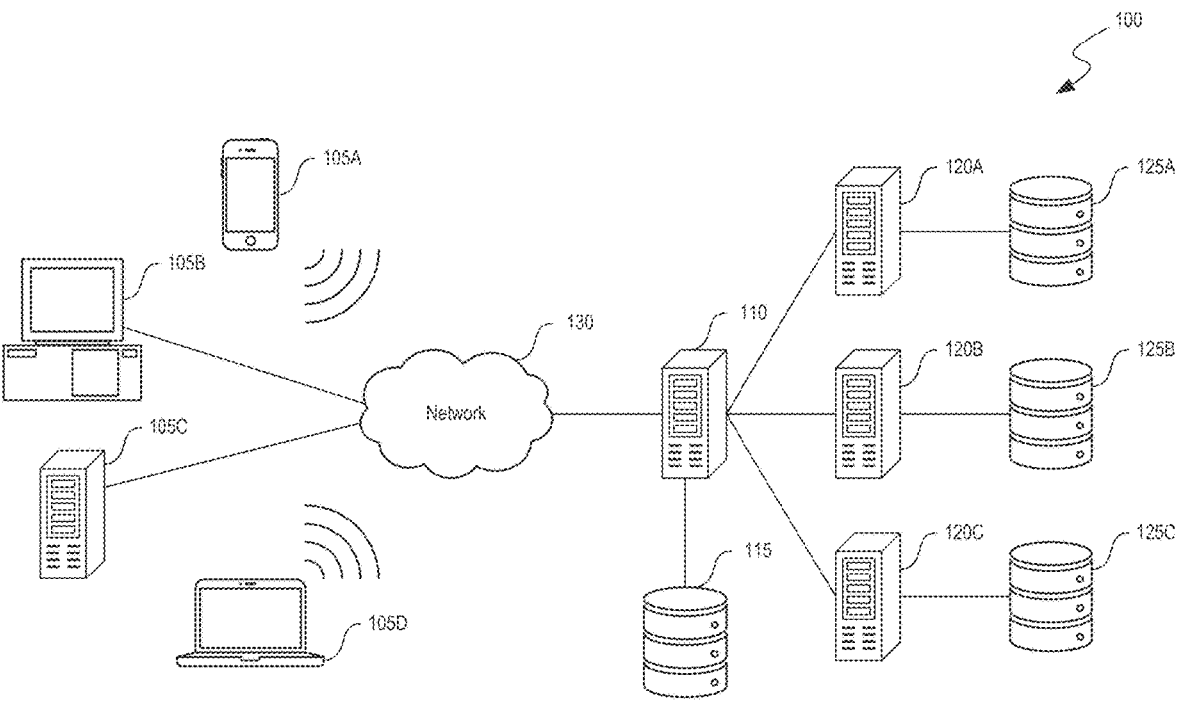
FIG. 1 is a system diagram illustrating an example of a computing environment in which the disclosed system operates in some implementations.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Contemporary digital communication systems face significant challenges in providing real-time, adaptive assistance to users engaged in complex interactions (e.g., customer service calls, sales negotiations, technical support sessions). Existing systems often rely on static scripts or predefined workflows that fail to account for the dynamic nature of human communication. These systems struggle to accurately interpret the nuanced context of conversations, including emotional states, intent shifts, and emerging topics (e.g., customer frustration, sudden changes in discussion direction, or introduction of unexpected issues). Furthermore, current solutions lack the ability to provide timely, contextually relevant interventions that can meaningfully improve the quality and outcomes of these interactions.

Traditional approaches to conversation analysis and agent assistance are limited by their inability to process and respond to communication signals in real-time. Such approaches often rely on post-interaction analysis, which prevents real-time corrective actions or guidance during pivotal moments of the conversation. Additionally, these systems typically focus on a single modality of communication (e.g., voice transcripts only), ignoring valuable information from other channels such as visual cues in video calls or textual nuances in chat interactions. This narrow focus results in incomplete understanding of the communication context and suboptimal support for users engaged in these interactions.

The present disclosure addresses these and other limitations of existing systems by providing an adaptive signal-to-event conversion platform that enables monitoring and analysis of digital communications in real-time across multiple modalities. For example, the platform continuously (e.g., for a representative sample of points in time at a high frequency, relative to the monitored time period) processes incoming signal data (e.g., audio streams, video feeds, text messages) and converts them into discrete, analyzable chunks. The platform can segment audio signals into phoneme-level units or break down video streams into frames or frame sequences for analysis. Further, the platform can employ advanced machine learning models to convert signal chunks into alphanumeric representations that capture the semantic and contextual essence of the communication. In some implementations, the platform can apply machine learning models (e.g., natural language processing algorithms, large language models, and/or the like) to extract key entities, topics, and sentiment indicators from text transcripts, enabling adaptive responses based on the detected communication patterns. For example, the platform can analyze metadata such as speech cadence, tone variations, and pause durations alongside the linguistic content to infer emotional states and conversation dynamics, allowing for more nuanced interpretation of user intent and more contextually appropriate interventions during critical moments in the conversation.

The platform can utilize sophisticated machine learning algorithms to map the alphanumeric signal sets to relevant event categories, enabling real-time understanding of the conversation's progression. For example, the platform can identify shifts in customer sentiment, detect emerging topics of concern, and/or recognize opportunities for follow-up customer interactions based on the analyzed signal data. Further, the platform can compare successive scoring distributions generated by these models to detect significant changes or divergences in the conversation flow, triggering appropriate interventive actions. For example, the platform dynamically adjusts its response strategy when detecting a shift from neutral to negative customer sentiment by immediately prompting the agent with de-escalation scripts tailored to the specific customer profile and conversation context. In another example, the platform adaptively prioritizes different intervention types based on real-time conversation analysis, such as switching from product information suggestions to empathy-focused responses when detecting customer frustration signals across multiple modalities. Additionally, the platform can implement progressive intervention escalation, where initial subtle agent prompts evolve into more direct action recommendations if conversation metrics continue to diverge from optimal patterns, ensuring proportional and contextually appropriate assistance throughout the interaction.

The adaptive signal-to-event conversion techniques described in this application can be applied across various technological fields beyond customer service and sales. In the healthcare sector, this platform can be applied to telemedicine use cases to assist medical professionals in detecting subtle cues in patient communications that may indicate underlying health issues or emotional states. In education technology, the platform can enhance remote learning experiences by providing real-time feedback to instructors based on student engagement signals and comprehension indicators. Additionally, in the realm of autonomous vehicles and human-machine interfaces, this platform can be utilized to improve the interpretation of driver or user intent, enhancing safety and user experience in complex interaction scenarios.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Example Computing Environment

FIG. 1 is a system diagram illustrating an example of a computing environment in which the disclosed system operates in some implementations. In some implementations, environment 100 includes one or more client computing devices 105A-D, examples of which can host the signal conversion system 200 of FIGS. 2A-2B. Client computing devices 105 operate in a networked environment using logical connections through network 130 to one or more remote computers, such as a server computing device.

In some implementations, server 110 is an edge server which receives client requests and coordinates fulfillment of those requests through other servers, such as servers 120A-C. In some implementations, servers 110 and 120, or associated computing devices, comprise computing systems, such as the signal conversion system 200 of FIGS. 2A-2B. Though each server 110 and 120, or associated computing device, is displayed logically as a single server, server computing devices can each be a distributed computing environment encompassing multiple computing devices located at the same or at geographically disparate physical locations. In some implementations, each server 120 corresponds to a group of servers.

Client computing devices 105 and servers 110 and 120, or associated computing devices, can each act as a server or client to other server or client devices. In some implementations, servers (110, 120A-C) connect to a corresponding database (115, 125A-C). As discussed above, each server 120 can correspond to a group of servers, and each of these servers can share a database or can have its own database. Databases 115 and 125 warehouse (e.g., store) information such as claims data, email data, call transcripts, call logs, policy data and so on. Though databases 115 and 125 are displayed logically as single units, databases 115 and 125 can each be a distributed computing environment encompassing multiple computing devices, can be located within their corresponding server, or can be located at the same or at geographically disparate physical locations.

Network 130 can be a local area network (LAN) or a wide area network (WAN) but can also be other wired or wireless networks. In some implementations, network 130 is the Internet or some other public or private network. Client computing devices 105 are connected to network 130 through a network interface, such as by wired or wireless communication. While the connections between server 110 and servers 120 are shown as separate connections, these connections can be any kind of local, wide area, wired, or wireless network, including network 130 or a separate public or private network.

Signal Conversion System

Figure 2A:
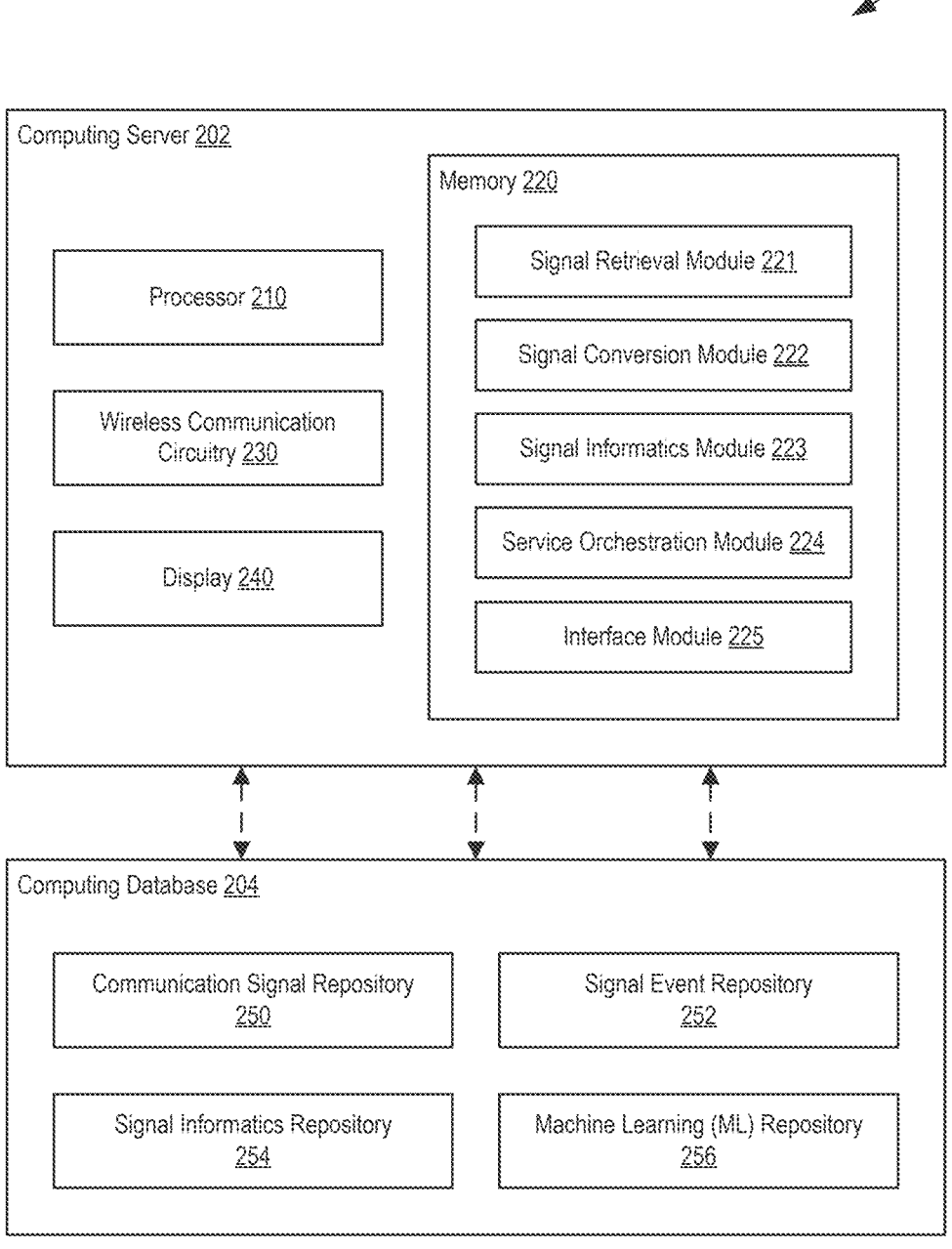
FIGS. 2A-2B are block diagrams that illustrate a signal conversion system that can implement aspects of the present technology.
Figure 2B:
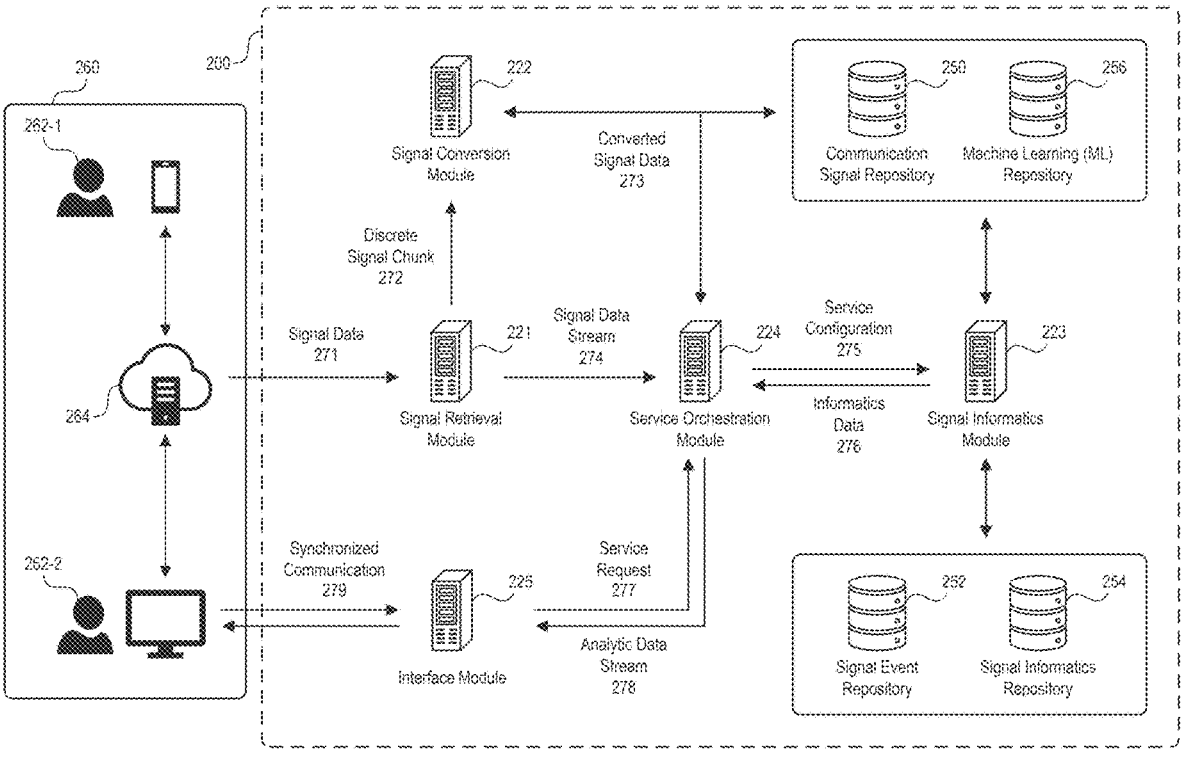

FIGS. 2A-2B are block diagrams that illustrate a signal conversion system 200 ("system 200") that can implement aspects of the present technology. The components shown in FIGS. 2A-2B are merely illustrative, and well-known components are omitted for brevity. As shown in FIG. 2A, the computing server 202 includes a processor 210, a memory 220, a wireless communication circuitry 230 to establish wireless communication and/or information channels (e.g., Wi-Fi, internet, APIs, communication standards) with other computing devices and/or services (e.g., servers, databases, cloud infrastructure), and a display 240 (e.g., user interface). The processor 210 can have generic characteristics similar to general-purpose processors, or the processor 210 can be an application-specific integrated circuit (ASIC) that provides arithmetic and control functions to the computing server 202. While not shown, the processor 210 can include a dedicated cache memory. The processor 210 can be coupled to all components of the computing server 202, either directly or indirectly, for data communication. Further, the processor 210 of the computing server 202 can be communicatively coupled to a computing database 204 that is hosted alongside the computing server 202 on the core network 106 described in reference to FIG. 1. As shown, the computing database 204 can include a communication signal repository 250, signal event repository 252, signal informatics repository 254, and a machine learning repository 256.

The memory 220 can comprise any suitable type of storage device including, for example, a static random-access memory (SRAM), dynamic random-access memory (DRAM), electrically erasable programmable read-only memory (EEPROM), flash memory, latches, and/or registers. In addition to storing instructions that can be executed by the processor 210, the memory 220 can also store data generated by the processor 210 (e.g., when executing the modules of an optimization platform). In additional, or alternative, embodiments, the processor 210 can store temporary information onto the memory 220 and store long-term data onto the computing database 204. The memory 220 is merely an abstract representation of a storage environment. Hence, in some embodiments, the memory 220 comprises one or more actual memory chips or modules.

As shown in FIG. 2A, modules of the memory 220 can include a signal retrieval module 221, signal conversion module 222, signal informatics module 223, service orchestration module 224, and interface module 225. Other implementations of the computing server 202 include additional, fewer, or different modules, or distribute functionality differently between the modules. As used herein, the term "module" and/or "engine" refers broadly to software components, firmware components, and/or hardware components. Accordingly, the modules 221-225 could each comprise software, firmware, and/or hardware components implemented in, or accessible to, the computing server 202.

As shown in FIG. 2B, a digital communication system 260 can facilitate communication between users and process digital communications signal data. The digital communication system 260 can include a participant user 262-1, a control entity 262-2, and a communications host service 264. The digital communication system 260 can be implemented as part of the computing environment 100 described in relation to FIG. 1, utilizing components such as the network 130, databases 115, and servers 120A-C to enable communication and data processing.

In some implementations, the participant user 262-1 can be an individual or entity (e.g., a customer, client, patient, and/or the like) engaging in digital communication (e.g., a phone call, video conference, text chat, email exchange, and/or the like) through the digital communication system 260. The participant user 262-1 can utilize a client computing device (e.g., a smartphone, tablet, laptop, desktop computer, and/or the like) to connect to the communications host service 264. The participant user 262-1 can initiate or receive communication (e.g., place a call, join a video conference, send a message, and/or the like) through an interface (e.g., a mobile application, web browser, dedicated software client, and/or the like) provided by the communications host service 264. For example, the participant user 262-1 can be a customer calling a company's support line to inquire about a product issue. In another example, the participant user 262-1 can be a patient joining a telemedicine video consultation with a healthcare provider. In yet another example, the participant user 262-1 can be a student participating in an online learning session with an instructor.

In some implementations, the control entity 262-2 can be an individual or entity (e.g., a customer service representative, technical support agent, healthcare provider, instructor, and/or the like) responsible for managing or facilitating the digital communication within the digital communication system 260. The control entity 262-2 can utilize a client computing device (e.g., a desktop computer, laptop, specialized workstation, and/or the like) to access the communications host service 264 and interact with the participant user 262-1. The control entity 262-2 can have access to additional tools and interfaces (e.g., customer relationship management systems, knowledge bases, diagnostic tools, and/or the like) to assist in managing the communication. For example, the control entity 262-2 can be a customer support agent handling multiple concurrent chat sessions with different participant users. In another example, the control entity 262-2 can be a sales representative conducting a product demonstration via video conference to multiple participant users. In yet another example, the control entity 262-2 can be a medical professional providing remote consultations to patients through a telemedicine platform.

In some implementations, a control entity 262-2 can be or include an executable agent. An executable agent (also sometimes referred to as an agent) can be thought of as a combination of software, firmware and/or hardware components that encompass characteristics (e.g., traits, attributes, properties, and/or knowledge), states (e.g., user question or its derivatives, agent feedback), and/or references to models (e.g., AI/ML model, such as neural networks) that enable execution of the agents' decision-making processes and behaviors. Instantiating (spawning) an agent refers to the process of creating a new instance of an agent entity, class or object, which can involve allocating memory for the agent's data structures and variables, initializing agent attributes, setting up agent communication channels, and activating agent reasoning and decision-making mechanisms. This process can be compared to creating a new thread or process in a computer program, where the instantiated agent operates as a separate entity, executing autonomously and interacting with its environment and other agents. Depending on the implementation, agents can take various forms, such as executables running on physical and/or virtual machines and/or robotic agents interacting with physical environments. In some cases, agents can be instantiated as containerized applications, leveraging technologies like Docker, or as serverless functions, utilizing platforms like AWS Lambda. Additionally, agents can be implemented using various programming paradigms, including object-oriented, functional, or logic-based programming, and can be designed to operate in diverse domains, such as e-commerce, healthcare, finance, or transportation.

Agents can use physical or virtualized resources (e.g., elements of FIGS. 1, 2, 5, 6, and/or 7) such as processors, memory, cache, communication interfaces, devices, databases, servers, components of the AI/ML stack) in any suitable combination. Particular ones of such resources can be statically allocated or dynamically allocated at runtime (e.g., to a particular agent or group of agents for a duration of a simulation session or a set of simulation sessions). Particular ones of such resources can be dedicated, shared among agents, or shared between an agent and other processes. Various components of agents (e.g., models, data stores, executables) can be implemented across resources in a distributed manner. Accordingly, unless otherwise indicated by context or expressly noted, the terms "local" (as in "local agent") and "node" (as in "agent node") should not be automatically assumed to refer to a particular unitary physical resource.

In some implementations, the communications host service 264 can be a centralized platform (e.g., a cloud-based service, distributed computing system, server cluster, and/or the like) that facilitates and manages digital communications between the participant user 262-1 and the control entity 262-2. The communications host service 264 can provide the necessary infrastructure (e.g., servers, databases, network connections, security protocols, and/or the like) to enable real-time or near-real-time communication across various modalities (e.g., voice, video, text, file sharing, and/or the like). The communications host service 264 can be implemented using third-party cloud services (e.g., Amazon Web Services, Google Cloud Platform, Microsoft Azure, and/or the like) or can be a proprietary system integrated within the signal conversion system 200. For example, the communications host service 264 can utilize Amazon Connect for voice communications, integrating with other AWS services for additional functionality. In another example, the communications host service 264 can be built on the Genesys Cloud platform, leveraging its omnichannel capabilities for customer interactions. In yet another example, the communications host service 264 can be a custom-developed solution using a combination of open-source technologies and proprietary components to meet specific organizational requirements.

In some implementations, the participant user 262-1 can have a stored communications signal profile (e.g., a user profile, conversation history, interaction preferences, and/or the like) that can be maintained in the communication signal repository 250. This communications signal profile can include information about the participant user 262-1, such as conversation preferences (e.g., preferred communication channels, language preferences, accessibility requirements, and/or the like), prior conversations (e.g., transcripts, summaries, outcomes, and/or the like), and prior interventive user actions (e.g., successful or unsuccessful actions taken during previous communications, recommended responses, and/or the like) that were applied in creating a desired outcome from the digital communication. For example, the communications signal profile can store data indicating that the participant user 262-1 prefers video calls for complex discussions, has a history of technical support inquiries related to a specific product, and responds positively to empathetic language in customer service interactions. In another example, the communications signal profile can include information about the participant user's 262-1 typical conversation patterns, such as frequently used phrases, common topics of discussion, or preferred times for communication. Additionally, the communications signal profile can store data about the participant user's 262-1 interaction with automated systems, such as chatbots or interactive voice response (IVR) systems, to inform future interactions and improve the efficiency of automated responses.

In some implementations, the signal retrieval module 221 can monitor digital communications between users within the digital communication system 260. The monitoring can include active monitoring, continuous monitoring, periodic monitoring, and/or responsive monitoring (e.g., performing computer-executable operations in response to receiving an electronic message). The signal retrieval module 221 can be a specialized software component (e.g., a dedicated program, a set of algorithms, a collection of functions, and/or the like) designed to capture and process various types of communication signals (e.g., audio streams, video feeds, text messages, file transfers, and/or the like) exchanged between the participant user 262-1 and the control entity 262-2. The signal retrieval module 221 can interface with the communications host service 264 through a set of predefined protocols (e.g., WebSocket, REST API, SIP, RTMP, and/or the like) to establish a continuous connection for real-time data retrieval. This active monitoring can involve the signal retrieval module 221 implementing event listeners (e.g., callback functions, webhooks, polling mechanisms, and/or the like) that trigger specific actions when new communication data becomes available. For example, the signal retrieval module 221 can set up a WebSocket connection to the communications host service 264 to receive instant notifications of new voice packets during a phone call between a customer and a support agent. In another example, the signal retrieval module 221 can utilize a REST API to periodically fetch updates from a chat session between a patient and a healthcare provider. In yet another example, the signal retrieval module 221 can employ a custom protocol to tap into a video stream of a remote product demonstration, capturing both audio and visual data in real-time.

In some implementations, the signal retrieval module 221 can implement various techniques to ensure the integrity and quality of the retrieved signal data. The signal retrieval module 221 can apply noise reduction algorithms (e.g., spectral subtraction, Wiener filtering, and/or the like) to improve the clarity of audio signals. The signal retrieval module 221 can also perform packet loss concealment (e.g., interpolation, extrapolation, and/or the like) to mitigate the effects of network issues on the retrieved data. Additionally, the signal retrieval module 221 can implement data compression techniques (e.g., lossy or lossless compression algorithms) to optimize storage and transmission of the retrieved signals. For example, the signal retrieval module 221 can use adaptive multi-rate (AMR) coding for voice signals to balance quality and bandwidth usage. In another example, the signal retrieval module 221 can apply H.264 compression to video streams to reduce file sizes while maintaining visual quality. In yet another example, the signal retrieval module 221 can use natural language processing techniques to extract key information from text-based communications, reducing the amount of data that needs to be processed and stored.

In some implementations, the signal retrieval module 221 can contemporaneously monitor the communications host service 264 that can be hosting a teleconference meeting between users. The signal retrieval module 221 can implement a multi-threaded architecture (e.g., concurrent processing, parallel execution, asynchronous operations, and/or the like) to handle the simultaneous (e.g., overlapping in time at least in part) monitoring of multiple communication channels and modalities. This monitoring can enable the signal retrieval module 221 to record real-time, or live, communications signal data 271 transmitted between users. Real-time, in this context, can refer to the processing and capture of data with minimal latency (e.g., milliseconds, microseconds, nanoseconds, and/or the like) from the moment of transmission to the moment of reception and processing. The signal retrieval module 221 can employ various techniques to achieve this real-time processing, such as buffer management (e.g., circular buffers, ring buffers, and/or the like), stream processing (e.g., Apache Kafka, Apache Flink, and/or the like), and low-latency networking protocols (e.g., UDP, QUIC, and/or the like). The communications signal data 271 can be recorded onto the communication signal repository 250, sent to the signal conversion module 222, or live streamed to the service orchestration module 224. For example, the signal retrieval module 221 can capture audio packets from a Voice over IP (VOIP) call and immediately write them to a high-speed solid-state drive in the communication signal repository 250 while simultaneously forwarding the data to the signal conversion module 222 for real-time transcription. In another example, the signal retrieval module 221 can process video frames from a telemedicine consultation, compressing and encrypting the data before streaming it to the service orchestration module 224 for immediate analysis. In yet another example, the signal retrieval module 221 can capture screen sharing data during a remote troubleshooting session, storing snapshots in the communication signal repository 250 while also sending metadata about user interactions to the signal conversion module 222 for pattern analysis.

In some implementations, the monitored and retrieved communications signal data 271 can be stored as a discrete signal chunk 272 of one or more signal modalities. The discrete signal chunk 272 can represent a segmented portion of the continuous communications signal data 271, divided based on various criteria (e.g., time intervals, data size, content boundaries, and/or the like). Signal modalities can refer to the different types or forms of communication data that can be captured and processed. These modalities can include, but are not limited to, audio signals (e.g., voice recordings, background sounds, music, and/or the like), visual signals (e.g., video streams, images, screen captures, and/or the like), textual signals (e.g., chat messages, email content, transcribed speech, and/or the like), and metadata signals (e.g., timestamps, user identifiers, device information, and/or the like). The signal retrieval module 221 can implement specialized algorithms for each modality to ensure accurate and efficient processing. For example, the signal retrieval module 221 can use adaptive audio segmentation techniques to create discrete signal chunks 272 from a continuous voice call, splitting the audio at natural pauses or speaker changes. In another example, the signal retrieval module 221 can employ computer vision algorithms to detect scene changes in a video stream, creating discrete signal chunks 272 for each distinct visual segment. In yet another example, the signal retrieval module 221 can utilize natural language processing to divide a long chat transcript into discrete signal chunks 272 based on topic changes or conversation turns.

In some implementations, the signal retrieval module 221 can process the obtained communications signal data 271 into discrete signal chunks 272. The discrete signal chunks 272 can represent segmented portions of the continuous communications signal data 271, divided based on various criteria (e.g., time intervals, data size, content boundaries, and/or the like). The signal retrieval module 221 can implement specialized algorithms for each signal modality to ensure accurate and efficient processing of the communications signal data 271 into discrete signal chunks 272. These algorithms can include adaptive segmentation techniques (e.g., dynamic time warping, change point detection, and/or the like) that analyze the characteristics of the incoming signal to determine optimal chunk boundaries. For example, the signal retrieval module 221 can use voice activity detection algorithms to create discrete signal chunks 272 from a continuous voice call, splitting the audio at natural pauses or speaker changes. In this case, the signal retrieval module 221 can analyze the energy levels and spectral content of the audio stream to identify periods of speech and silence, using these transitions as chunk boundaries. In another example, the signal retrieval module 221 can employ computer vision algorithms to detect scene changes in a video stream, creating discrete signal chunks 272 for each distinct visual segment. This can involve analyzing frame-to-frame differences in pixel values, color histograms, or feature descriptors to identify significant visual changes that warrant a new chunk. In yet another example, the signal retrieval module 221 can utilize natural language processing techniques to divide a long chat transcript into discrete signal chunks 272 based on topic changes or conversation turns. This can include applying techniques such as topic modeling, sentiment analysis, or dialogue act classification to identify meaningful boundaries within the text-based communication.

In some implementations, the signal retrieval module 221 can define the discrete signal chunks 272 based on a predetermined set amount of signal data or a specific time interval range. The signal retrieval module 221 can implement a configurable chunking mechanism that allows for flexible definition of chunk sizes based on the requirements of downstream processing modules (e.g., the signal conversion module 222, the signal informatics module 223, and/or the like) or the characteristics of the communication channel. This mechanism can involve maintaining internal buffers (e.g., circular buffers, ring buffers, and/or the like) to accumulate incoming signal data until a specified threshold is reached. For example, the signal retrieval module 221 can create discrete signal chunks 272 of audio data every 30 seconds during a voice call, regardless of the content or speaker changes. In this case, the signal retrieval module 221 can maintain a rolling buffer of audio samples, flushing the buffer and creating a new chunk every 30 seconds of recorded audio. In another example, the signal retrieval module 221 can define discrete signal chunks 272 for text-based communications based on a fixed number of characters or messages. This can involve accumulating incoming text data in a buffer until a specified character count or message count is reached, at which point the buffer is processed into a discrete chunk and cleared for the next accumulation cycle. In yet another example, the signal retrieval module 221 can create discrete signal chunks 272 for video streams based on a fixed number of frames or a specific file size limit. This can involve monitoring the incoming video data stream, counting frames or tracking file size, and initiating a new chunk when the specified threshold is reached.

In some implementations, the signal retrieval module 221 can store the completed discrete signal chunks 272 in the communication signal repository 250 once the monitored recording for each chunk has been completed. The signal retrieval module 221 can implement a robust storage management system that ensures efficient writing of the discrete signal chunks 272 to the communication signal repository 250 while maintaining data integrity and enabling fast retrieval for subsequent processing. This system can involve techniques such as write-ahead logging (e.g., journaling, transaction logs, and/or the like), data compression (e.g., lossless compression algorithms, domain-specific compression techniques, and/or the like), and indexing (e.g., B-tree indexes, inverted indexes, and/or the like) to optimize storage and retrieval operations. For example, the signal retrieval module 221 can use a combination of in-memory caching and solid-state drive (SSD) storage to rapidly write completed audio chunks from a voice call to the communication signal repository 250. In this case, the signal retrieval module 221 can temporarily hold completed chunks in a high-speed cache, periodically flushing the cache to persistent storage in the communication signal repository 250 to balance performance and data durability. In another example, the signal retrieval module 221 can employ a distributed storage system to handle the storage of large video chunks from multiple concurrent video conferences. This can involve partitioning the video data across multiple storage nodes in the communication signal repository 250, using techniques such as sharding or consistent hashing to distribute the load and ensure scalability. In yet another example, the signal retrieval module 221 can implement a hierarchical storage management system for text-based communication chunks, automatically moving older or less frequently accessed chunks to lower-cost storage tiers within the communication signal repository 250 while maintaining rapid access to recent or frequently used data.

In some implementations, the signal retrieval module 221 can send the discrete signal chunks 272 to the signal conversion module 222 for further downstream processes. The signal retrieval module 221 can implement an efficient data transfer mechanism to ensure that the discrete signal chunks 272 are promptly and reliably delivered to the signal conversion module 222 for subsequent processing. This mechanism can involve techniques such as asynchronous messaging (e.g., message queues, publish-subscribe systems, and/or the like), data streaming (e.g., Apache Kafka, Apache Flink, and/or the like), and load balancing (e.g., round-robin distribution, least connections algorithm, and/or the like) to optimize the flow of data between modules and ensure efficient utilization of system resources. For example, the signal retrieval module 221 can use a message queue system to send completed audio chunks to the signal conversion module 222 for transcription, ensuring that chunks are processed in the order they were created and allowing for parallel processing of multiple chunks. In this case, the signal retrieval module 221 can implement a priority queue system, assigning higher priority to chunks from active conversations to minimize latency in real-time applications.

In another example, the signal retrieval module 221 can employ a data streaming approach to continuously feed video chunks to the signal conversion module 222 for real-time analysis, enabling immediate processing of visual data without waiting for complete chunks to be formed. This can involve using a streaming protocol that allows for partial chunk processing, enabling the signal conversion module 222 to begin analysis on incoming video data before the entire chunk is received. In yet another example, the signal retrieval module 221 can implement a load-balanced approach to distribute text-based communication chunks across multiple instances of the signal conversion module 222, optimizing processing throughput for high-volume text analysis tasks. This can involve dynamically scaling the number of signal conversion module 222 instances based on the current processing load and distributing chunks using algorithms that consider factors such as chunk size, processing complexity, and module availability.

In some implementations, the signal retrieval module 221 can also obtain data from Customer Relationship Management (CRM) systems and other industry-specific core solutions alongside the digital communication data. This additional data can provide context and enrichment to the communications signal data 271, enabling more comprehensive analysis and insights. The additional data can include, but can be not limited to, customer profile information (e.g., demographics, purchase history, support tickets, and/or the like), account details (e.g., subscription status, billing information, usage metrics, and/or the like), product or service data (e.g., specifications, inventory levels, pricing, and/or the like), and industry-specific metrics (e.g., patient health records, financial transaction history, educational performance data, and/or the like). The signal retrieval module 221 can implement secure data integration methods (e.g., API connections, database queries, ETL processes, and/or the like) to fetch this additional data in real-time or near-real-time, synchronizing it with the ongoing communication. For example, the signal retrieval module 221 can query a CRM database to retrieve a customer's purchase history and support ticket history as soon as a support call can be initiated, providing this context to the signal conversion module 222 for more accurate intent recognition. In another example, the signal retrieval module 221 can access an electronic health record system during a telemedicine consultation, pulling relevant medical history and test results to supplement the video and audio data being processed. In yet another example, the signal retrieval module 221 can integrate with a financial services platform during a wealth management video conference, retrieving real-time market data and portfolio information to enrich the conversation analysis.

In some implementations, the signal retrieval module 221 can work in conjunction with other components of the signal conversion system 200 to enhance its functionality. The signal retrieval module 221 can interact with the signal conversion module 222 to pre-process retrieved signals for more efficient conversion. The signal retrieval module 221 can also communicate with the service orchestration module 224 to prioritize and manage the retrieval of signals based on system load and user requirements. Furthermore, the signal retrieval module 221 can leverage the machine learning repository 256 to improve its signal retrieval and processing capabilities over time. For example, the signal retrieval module 221 can use machine learning models to dynamically adjust audio sampling rates based on the detected speech patterns. In another example, the signal retrieval module 221 can employ natural language understanding models to identify and prioritize high-priority communications for immediate processing. In yet another example, the signal retrieval module 221 can utilize computer vision algorithms to extract relevant visual information from video streams, such as facial expressions or gestures, to complement the audio analysis.

In some implementations, the signal conversion module 222 can convert raw, unprocessed signal data obtained from the digital communication between users into one or more standardized data forms. The signal conversion module 222 can be a specialized software component (e.g., a dedicated program, a set of algorithms, a collection of functions, and/or the like) designed to transform various types of communication signals (e.g., audio streams, video feeds, text messages, file transfers, and/or the like) into a consistent and analyzable format. The signal conversion module 222 can implement multiple conversion pipelines, each tailored to handle specific signal modalities and output requirements. These pipelines can involve a series of processing steps (e.g., signal preprocessing, feature extraction, model inference, post-processing, and/or the like) that work together to convert the input signals into the desired standardized format. For example, the signal conversion module 222 can convert audio recordings of customer support calls into text transcripts, enabling easier analysis and searchability of the conversation content. In another example, the signal conversion module 222 can transform video streams from telemedicine consultations into structured data formats that capture relevant visual cues and patient behaviors. In yet another example, the signal conversion module 222 can convert multi-modal communication data from a virtual reality training session into a unified representation that combines textual, audio, and spatial information for comprehensive analysis.

In some implementations, the signal conversion module 222 can convert sequential chunks of audio data into one or more corresponding text transcripts as the audio data can be recorded. The signal conversion module 222 can implement a real-time speech-to-text conversion system that processes incoming audio chunks (e.g., discrete signal chunks 272) as they become available, generating text transcripts on-the-fly. This system can utilize advanced automatic speech recognition (ASR) techniques (e.g., deep neural networks, hidden Markov models, and/or the like) to convert spoken language into written text with high accuracy and low latency. The signal conversion module 222 can maintain a buffer (e.g., a circular buffer, a ring buffer, and/or the like) to accumulate incoming audio chunks, ensuring a continuous flow of data for transcription. As each audio chunk can be processed, the resulting text can be appended to an ongoing transcript, creating a single large transcript that can be built over time. To perform this conversion process, the signal conversion module 222 can first apply audio preprocessing techniques (e.g., noise reduction, dereverberation, speaker diarization, and/or the like) to enhance the quality of the input signal. The preprocessed audio can then be fed into an acoustic model (e.g., a convolutional neural network, a recurrent neural network, and/or the like) that converts the audio features into phoneme probabilities. These probabilities can be decoded using a language model (e.g., an n-gram model, a neural language model, and/or the like) to determine the most likely sequence of words. The signal conversion module 222 can also implement post-processing steps (e.g., punctuation insertion, capitalization, formatting, and/or the like) to improve the readability and structure of the generated transcript. For example, the signal conversion module 222 can convert audio chunks from a customer support call into a real-time transcript, allowing the control entity 262-2 to quickly scan and respond to customer inquiries. In another example, the signal conversion module 222 can transcribe a multi-speaker conference call, using speaker diarization techniques to attribute each segment of the transcript to the correct participant. In yet another example, the signal conversion module 222 can convert audio from a medical dictation system into structured clinical notes, applying domain-specific language models to improve accuracy in medical terminology.

In some implementations, the signal conversion module 222 can utilize machine learning models, such as semantic natural language models, to convert the signal data. The signal conversion module 222 can leverage advanced natural language processing (NLP) techniques (e.g., transformer architectures, BERT models, GPT models, and/or the like) to understand and transform the semantic content of the input signals. These machine learning models can be pre-trained on large corpora of domain-specific data (e.g., customer support conversations, medical terminology, legal documents, and/or the like) and fine-tuned for specific conversion tasks. The signal conversion module 222 can implement a modular architecture that allows for the integration of multiple specialized models, each designed to handle various aspects of the conversion process (e.g., entity recognition, sentiment analysis, intent classification, and/or the like). To process input signals, the signal conversion module 222 can first tokenize the data (e.g., break down text or transcribed speech into individual words or subwords) and encode it into a format suitable for the machine learning models. The encoded input can then be passed through one or more layers of the neural network models, which can extract relevant features and generate contextual representations of the input. These representations can be used to perform various conversion tasks, such as translating between languages, summarizing content, or extracting structured information. The signal conversion module 222 can also implement attention mechanisms (e.g., self-attention, cross-attention, and/or the like) to focus on relevant parts of the input when generating output, improving the accuracy and coherence of the converted signal data. For example, the signal conversion module 222 can use a semantic natural language model to convert customer emails into structured support tickets, automatically categorizing issues and extracting key details. In another example, the signal conversion module 222 can employ a multilingual transformer model to provide real-time translation of international business negotiations, preserving the nuances and context of the original conversation. In yet another example, the signal conversion module 222 can utilize a domain-specific BERT model to convert unstructured medical narratives into standardized clinical reports, ensuring consistent formatting and terminology across different healthcare providers.

In some implementations, the signal conversion module 222 can generate converted signal data 273 from the discrete signal chunks 272. The converted signal data 273 can be a standardized representation of the original communications signal data 271, transformed into a format that can In some implementations, the signal conversion module 222 can convert raw, unprocessed signal data obtained from the digital communication between users into one or more standardized data forms. The signal conversion module 222 can be a specialized software component (e.g., a dedicated program, a set of algorithms, a collection of functions, and/or the like) designed to transform various types of input signals (e.g., audio streams, video feeds, text messages, file transfers, and/or the like) into a consistent and analyzable format. The signal conversion module 222 can implement multiple conversion pipelines, each tailored to handle particular signal modalities (e.g., speech-to-text for audio, optical character recognition for images, natural language processing for text, and/or the like). These conversion pipelines can utilize advanced signal processing techniques (e.g., Fourier transforms, wavelet analysis, feature extraction, and/or the like) to extract relevant information from the raw signal data. For example, the signal conversion module 222 can convert a series of audio chunks from a customer support call into a text transcript, preserving speaker identification and temporal information. In another example, the signal conversion module 222 can process video frames from a telemedicine consultation, extracting visual cues (e.g., facial expressions, body language, and/or the like) and converting them into structured metadata. In yet another example, the signal conversion module 222 can analyze chat messages from a technical support session, converting colloquial language and abbreviations into standardized technical terms for easier processing by downstream modules.

In some implementations, the signal conversion module 222 can convert sequential chunks of audio data into one or more corresponding text transcripts as the audio data can be recorded. The signal conversion module 222 can implement a real-time speech recognition system (e.g., automatic speech recognition, continuous speech recognition, and/or the like) that processes incoming audio chunks (e.g., discrete signal chunks 272) as the audio data can be captured during the digital communication. The real-time speech recognition system can utilize advanced acoustic models (e.g., hidden Markov models, deep neural networks, and/or the like) and language models (e.g., n-gram models, recurrent neural networks, and/or the like) to convert speech into text with high accuracy and low latency. The signal conversion module 222 can maintain a buffer (e.g., a circular buffer, a ring buffer, and/or the like) to temporarily store incoming audio chunks, ensuring continuous processing even if there can be slight variations in chunk arrival times. As each audio chunk can be processed, the resulting text can be appended to an ongoing transcript, which can be continuously updated and refined. For example, the signal conversion module 222 can process 30-second audio chunks from a customer service call, converting each chunk into text and appending it to a growing transcript document. The signal conversion module 222 can apply speaker diarization techniques (e.g., voice activity detection, speaker clustering, and/or the like) to distinguish between different speakers in the conversation, labeling each segment of the transcript accordingly. In another example, the signal conversion module 222 can handle multi-language conversations by dynamically switching between language models based on detected speech patterns, producing a transcript that accurately captures code-switching and language transitions. In yet another example, the signal conversion module 222 can integrate with a custom domain-specific language model trained on industry jargon and technical terms, improving transcription accuracy for specialized conversations such as medical consultations or legal proceedings.

In some implementations, the signal conversion module 222 can utilize machine learning models, such as semantic natural language models, to convert the signal data. The signal conversion module 222 can leverage advanced natural language processing (NLP) techniques (e.g., transformer architectures, BERT models, GPT models, and/or the like) to understand and process the context and meaning of the converted signal data. These semantic natural language models can be pre-trained on large corpora of text data and fine-tuned for specific domains or tasks relevant to the digital communication system 260. The signal conversion module 222 can implement a pipeline that first converts raw signal data into text (if necessary) and then applies the semantic natural language models to extract higher-level features, intent, and context from the text. For example, the signal conversion module 222 can use a BERT-based model to analyze transcribed customer support conversations, identifying key topics, sentiment, and urgency levels within the text. The model can be fine-tuned on a dataset of previous support interactions to improve its accuracy in detecting domain-specific issues and intents. In another example, the signal conversion module 222 can employ a GPT-based model to generate summaries of long-form communications, such as email threads or chat logs, capturing the essential points and action items in a concise format. The model can be trained to recognize and prioritize certain types of information based on the specific needs of the digital communication system 260. In yet another example, the signal conversion module 222 can utilize a custom-built transformer model to analyze multi-modal inputs, such as combining transcribed speech with extracted visual cues from video, to provide a more comprehensive understanding of the communication context.

In some implementations, the signal conversion module 222 can generate converted signal data 273 as the output of the conversion process. The converted signal data 273 can be a structured representation of the original raw signal data, transformed into a format that can be easily processed and analyzed by other components of the signal conversion system 200. The converted signal data 273 can include multiple layers of information, such as the raw text of a transcript, semantic annotations, metadata about the conversion process, and any extracted features or insights. The signal conversion module 222 can implement a flexible data schema (e.g., JSON, XML, Protocol Buffers, and/or the like) to represent the converted signal data 273, allowing for easy integration with various downstream processes and storage systems. For example, the converted signal data 273 for an audio conversation can include the full text transcript, speaker labels, timestamps for each utterance, detected emotions, identified entities (e.g., product names, dates, locations), and confidence scores for each converted element. In another example, the converted signal data 273 for a video conference can comprise transcribed speech, extracted visual features (e.g., facial expressions, gestures), screen content analysis, and participant engagement metrics. In yet another example, the converted signal data 273 for a chat session can include the normalized text, detected intents, sentiment scores, and any automatically generated responses or suggestions.

In some implementations, the signal conversion module 222 can store the converted signal data 273 in the communication signal repository 250. The signal conversion module 222 can implement an efficient storage mechanism (e.g., database transactions, write-ahead logging, and/or the like) to ensure that the converted signal data 273 can be persistently and reliably stored for future reference and analysis. The storage process can involve indexing the converted signal data 273 based on various attributes (e.g., timestamp, conversation ID, participant IDs, detected topics) to facilitate fast retrieval and querying. The signal conversion module 222 can also implement data versioning and change tracking to maintain a history of modifications to the converted signal data 273 over time. For example, the signal conversion module 222 can store each version of a transcript as it evolves during a real-time conversion process, allowing for analysis of how the conversation progressed and how the conversion accuracy improved over time. In another example, the signal conversion module 222 can implement a distributed storage solution that partitions the converted signal data 273 across multiple nodes in the communication signal repository 250 based on conversation topics or time ranges, enabling efficient parallel processing for large-scale analytics. In yet another example, the signal conversion module 222 can employ compression techniques tailored to the structure of the converted signal data 273, such as specialized text compression algorithms for transcripts or feature vector compression for extracted semantic information, to optimize storage utilization while maintaining quick access times.

In some implementations, the converted signal data 273 generated by the signal conversion module 222 can be used by the service orchestration module 224 for downstream processes. The signal conversion module 222 can implement an event-driven architecture (e.g., publish-subscribe pattern, message queues, and/or the like) to notify the service orchestration module 224 when new converted signal data 273 can be available for processing. This notification system can include metadata about the converted signal data 273, such as the type of conversion performed, the confidence level of the conversion, and any initial insights or flags that might be relevant for prioritization. The signal conversion module 222 can also provide an interface (e.g., API, shared memory, and/or the like) for the service orchestration module 224 to directly query or access specific portions of the converted signal data 273 as needed for various downstream tasks. For example, the signal conversion module 222 can send real-time notifications to the service orchestration module 224 as each chunk of a customer support call can be converted, allowing for immediate analysis and potential interventions during the ongoing conversation. In another example, the signal conversion module 222 can provide a streaming interface for the service orchestration module 224 to access a continuous flow of converted signal data 273 from multiple concurrent video conferences, enabling real-time sentiment analysis and engagement monitoring across all active sessions. In yet another example, the signal conversion module 222 can implement a batch processing mode where it accumulates converted signal data 273 from multiple sources over a specified time period before triggering a comprehensive analysis task in the service orchestration module 224, such as generating end-of-day reports or updating long-term trend models.

In some implementations, the signal informatics module 223 can process and analyze the converted signal data 273 to generate informatics data 276 about the digital communication. The signal informatics module 223 can be a specialized software component (e.g., a dedicated program, a set of algorithms, a collection of functions, and/or the like) designed to extract meaningful insights and actionable information from the converted signal data 273. The signal informatics module 223 can implement advanced data analysis techniques (e.g., statistical analysis, machine learning algorithms, natural language processing, and/or the like) to identify patterns, trends, and anomalies within the converted signal data 273. The signal informatics module 223 can utilize the computing server 202 resources, including the processor 210 and memory 220, to perform complex computations and data manipulations. Additionally, the signal informatics module 223 can leverage the machine learning repository 256 to access pre-trained models and algorithms that enhance the analysis capabilities. For example, the signal informatics module 223 can analyze the text transcript of a customer support call to identify key topics discussed, measure customer sentiment throughout the conversation, and flag any potential escalation points. In another example, the signal informatics module 223 can process video conference data to assess participant engagement levels, detect non-verbal cues, and summarize key decision points. In yet another example, the signal informatics module 223 can analyze chat logs from a technical support session to identify recurring issues, measure resolution time, and suggest knowledge base articles for future reference.

In some implementations, the signal informatics module 223 can include multiple services that specialize in performing specific data analysis tasks or generating specific data outputs. These specialized services can be implemented as modular components (e.g., microservices, plugins, function libraries, and/or the like) within the signal informatics module 223, allowing for flexibility and scalability in processing various types of digital communications. Each service can be designed to focus on a particular aspect of the converted signal data 273, applying targeted algorithms and analytical approaches to extract relevant information. The signal informatics module 223 can implement a service orchestration layer that manages the execution and coordination of these specialized services, ensuring efficient resource utilization and timely delivery of results. The service orchestration layer can use techniques such as parallel processing, load balancing, and prioritization to optimize the performance of the multiple services. For example, the signal informatics module 223 can include a sentiment analysis service that focuses on detecting emotional tones in text and speech, a topic modeling service that identifies main themes in conversations, and an entity recognition service that extracts important names, dates, and locations from the converted signal data 273. In another example, the signal informatics module 223 can have a service dedicated to analyzing call flow patterns in customer support interactions, another service for detecting compliance violations in financial conversations, and a third service for summarizing action items from team meetings. In yet another example, the signal informatics module 223 can implement services for real-time language translation, speaker identification, and background noise classification, all working in concert to provide a comprehensive analysis of multilingual conference calls.

In some implementations, the signal informatics module 223 can have a service for responding to a query from the control entity 262-2 regarding the digital communication. This service can be designed to process and interpret natural language queries (e.g., questions, commands, requests for information, and/or the like) submitted by the control entity 262-2 through an interface provided by the interface module 225. The service can implement advanced natural language understanding (NLU) techniques (e.g., semantic parsing, intent recognition, entity extraction, and/or the like) to comprehend the context and specifics of the query. Upon receiving a query, the service can access the communication signal repository 250 and the signal event repository 252 to retrieve relevant historical and current communication data. The service can then employ a large language model (LLM) (e.g., GPT-3, BERT, T5, and/or the like) to generate a contextually appropriate and informative response to the query. The LLM can be fine-tuned on domain-specific data to ensure accuracy and relevance in the generated responses. For example, the service can receive a query from a customer support supervisor asking, "What can be the main issues reported by customers in the past week?" The service can then analyze recent call transcripts, chat logs, and email correspondences to identify recurring themes, quantify issue frequencies, and generate a concise summary of the top customer concerns. In another example, the service can handle a query from a sales manager requesting, "Show me the objections raised by potential clients during recent product demonstrations." The service can then process video conference recordings and presentation transcripts to extract and categorize client objections, providing insights into common hesitations and areas for improvement in the sales pitch. In yet another example, the service can respond to a query from a compliance officer asking, "Have there been any potential policy violations in today's customer interactions?" The service can then scan through the day's communications, applying compliance-specific rules and detection algorithms to flag any suspicious activities or language for further review.

In some implementations, the signal informatics module 223 can include a service that generates suggestions or next-best-action recommendations for control entities 262-2 based on customer data insights. This service can be designed to continuously analyze the converted signal data 273 in real-time, identifying patterns, trends, and potential opportunities for improving the communication process. The service can implement machine learning algorithms (e.g., decision trees, random forests, gradient boosting machines, and/or the like) to evaluate the current state of the communication and predict optimal actions or responses. To generate these recommendations, the service can first create an event scoring distribution for discrete chunks of the converted signal data 273. The event scoring distribution can be a probabilistic representation (e.g., a vector of probabilities, a histogram, a probability density function, and/or the like) that indicates the likelihood of the signal data relating to specific events or event categories. The service can utilize a machine learning model (e.g., a neural network, a support vector machine, a naive Bayes classifier, and/or the like) trained on historical communication data to generate this distribution. The event categories can encompass a wide range of communication aspects, such as customer intent (e.g., making a purchase, seeking support, filing a complaint, and/or the like), conversation stage (e.g., introduction, problem identification, solution proposal, closing, and/or the like), or emotional state (e.g., satisfied, frustrated, confused, and/or the like). Based on the identified event categories and their probabilities, the service can then determine appropriate interventive user actions, including but not limited to strategic interventions (e.g., recommended signaling to pivot forward contents of digital communication), disclaimers, and/or chats (e.g., executable or displayable). These actions can be selected from a predefined set of strategies or dynamically generated based on the specific context of the communication. For example, during a customer support call, if the event scoring distribution indicates a high probability of customer frustration, the service can recommend that the control entity 262-2 acknowledge the customer's feelings, offer an apology, and propose an immediate solution to address the issue. In another example, during a sales negotiation, if the event scoring distribution suggests that the potential client can be hesitant about pricing, the service can recommend that the control entity 262-2 emphasize the long-term value of the product, offer a limited-time discount, or suggest a flexible payment plan. In yet another example, during a medical consultation, if the event scoring distribution indicates that the patient may be struggling to understand complex medical terminology, the service can recommend that the healthcare provider use simpler language, provide visual aids, or offer additional resources for patient education.

In some implementations, the signal informatics module 223 can have a service that performs post-call automation functions that integrate with backend client systems to automate tasks. This service can be designed to streamline and automate various administrative and follow-up tasks that typically occur after a digital communication session has ended. The service can implement application programming interfaces (APIs) (e.g., RESTful APIs, GraphQL, SOAP, and/or the like) to establish secure connections with external systems such as Customer Relationship Management (CRM) platforms, email servers, ticketing systems, and other relevant backend infrastructure. The service can analyze the converted signal data 273 and the generated informatics data 276 to extract key information and action items that need to be recorded or acted upon. Using natural language processing techniques (e.g., named entity recognition, relationship extraction, summarization, and/or the like), the service can identify and categorize important details from the communication. The service can then format this information according to the requirements of the target backend systems and initiate the appropriate API calls to update records, create new entries, or trigger automated workflows. For example, after a sales call, the service can automatically update the CRM system with new contact information, log the call duration and outcome, create follow-up tasks for the sales representative, and send a personalized email to the prospect with requested product information. In another example, following a customer support interaction, the service can update the support ticket status, add detailed notes to the case file, schedule any necessary follow-up actions, and trigger an automated customer satisfaction survey. In yet another example, after a telemedicine consultation, the service can update the electronic health record with the diagnosis and treatment plan, generate and send an e-prescription to the patient's preferred pharmacy, and schedule a follow-up appointment in the clinic's booking system.

In some implementations, the signal informatics module 223 can have a service for generating an affective scoring distribution based on the converted signal data 273. This service can be designed to analyze and quantify the emotional content and sentiment expressed within the digital communication. The affective scoring distribution can be a probabilistic representation (e.g., a vector of sentiment scores, a multi-dimensional emotion space, a time series of affective states, and/or the like) that captures the nuanced emotional aspects of the communication. The service can implement advanced sentiment analysis techniques (e.g., lexicon-based approaches, machine learning classifiers, deep learning models, and/or the like) to process textual, audio, and visual components of the converted signal data 273. To generate the affective scoring distribution, the service can first preprocess the converted signal data 273 to extract relevant features (e.g., linguistic patterns, acoustic properties, facial expressions, and/or the like) that are indicative of emotional states. The service can then apply machine learning models (e.g., recurrent neural networks, transformer-based models, ensemble methods, and/or the like) trained on large datasets of emotionally labeled content to classify and score the extracted features. The service can also incorporate contextual information from user profiles stored in the communication signal repository 250 to refine the affective analysis, taking into account individual communication styles and historical patterns. For example, during a customer support call, the service can generate an affective scoring distribution that tracks the customer's emotional journey throughout the conversation, identifying moments of frustration, relief, and satisfaction. This information can be used to assess the effectiveness of the support provided and identify areas for improvement. In another example, in a sales negotiation context, the service can analyze the affective scoring distribution of both the salesperson and the potential client, providing insights into the rapport building process and highlighting moments of alignment or divergence in emotional states. In yet another example, for a mental health teletherapy session, the service can generate a detailed affective scoring distribution that captures subtle changes in the patient's emotional state, helping the therapist identify underlying issues and track progress over time.

In some implementations, the signal informatics module 223 can have a service that generates summaries including key points, action items, customer sentiments, and other relevant details from the digital communication. This service can be designed to distill large volumes of converted signal data 273 into concise, actionable summaries that capture the essence of the communication. The service can implement advanced natural language processing techniques (e.g., extractive summarization, abstractive summarization, topic modeling, and/or the like) to identify and synthesize the most important information from the digital communication. The summarization process can be performed progressively as the communication continues or as a comprehensive analysis at the end of the interaction. To generate these summaries, the service can first segment the converted signal data 273 into meaningful units (e.g., topics, turns of conversation, logical sections, and/or the like) using techniques such as text segmentation and discourse analysis. The service can then apply machine learning models (e.g., sequence-to-sequence models, attention mechanisms, graph-based ranking algorithms, and/or the like) to extract or generate summary content for each segment. The service can also integrate insights from other analytical services within the signal informatics module 223, such as sentiment analysis and event categorization, to enrich the summaries with additional context. For example, during an extended customer support interaction, the service can generate progressive summaries at regular intervals, highlighting resolved issues, pending concerns, and shifts in customer sentiment. This can allow supervisors to quickly assess the progress of ongoing calls without needing to listen to the entire conversation. In another example, following a complex business negotiation, the service can produce a comprehensive summary that outlines the key points of agreement, unresolved issues, action items for each party, and an analysis of the overall negotiation dynamics. In yet another example, for a series of related communications (e.g., a support ticket with multiple interactions), the service can generate a cumulative summary that tracks the evolution of the issue, key decisions made, and the ultimate resolution, providing a clear audit trail of the entire process.

In some implementations, the signal informatics module 223 can have a service that performs automated audits using pre-defined industry-specific audit templates to track call progress and generate alerts for deviations. This service can be designed to continuously monitor and evaluate digital communications against standardized criteria, ensuring compliance with industry regulations, company policies, and best practices. The service can implement a flexible template system that allows for the creation and customization of audit criteria based on specific industry requirements (e.g., financial services regulations, healthcare privacy standards, customer service quality metrics, and/or the like). These audit templates can be stored in the signal event repository 252 and can be easily updated or modified as regulations and standards evolve. To perform the automated audits, the service can first load the appropriate audit template based on the context of the digital communication. The service can then analyze the converted signal data 273 in real-time, comparing the content and flow of the communication against the predefined audit criteria. The service can use natural language processing techniques (e.g., keyword matching, semantic similarity analysis, intent recognition, and/or the like) to identify relevant parts of the conversation that correspond to specific audit checkpoints. When deviations from the expected process or potential compliance issues are detected, the service can generate immediate alerts to supervisors or compliance officers. These alerts can be prioritized based on the severity and potential impact of the deviation. For example, in a financial advisory call, the service can use an audit template that checks for proper disclosure of risks, verification of client identity, and adherence to investment suitability guidelines. If the advisor fails to provide a required risk disclosure, the service can immediately flag this omission and prompt the advisor to address it before the call concludes. In another example, for a healthcare provider conducting telemedicine consultations, the service can apply an audit template that ensures patient privacy can be maintained, proper informed consent can be obtained, and all necessary medical history questions are asked. The service can generate alerts if any of these critical steps are missed or performed incorrectly. In yet another example, in a customer service environment, the service can use audit templates to track adherence to greeting protocols, problem-solving procedures, and customer satisfaction checkpoints, providing real-time feedback to agents and identifying opportunities for additional training or process improvements.

In some implementations, the service orchestration module 224 can manage a signal data stream 274 and interact with other components of the signal conversion system 200. The service orchestration module 224 can be a specialized software component (e.g., a dedicated program, a set of algorithms, a collection of functions, and/or the like) designed to coordinate and control the flow of data between various modules within the signal conversion system 200. The service orchestration module 224 can implement advanced data streaming techniques (e.g., publish-subscribe patterns, message queues, event-driven architectures, and/or the like) to efficiently handle the continuous flow of signal data and ensure real-time processing capabilities. To manage the signal data stream 274, the service orchestration module 224 can first establish connections with data sources (e.g., the signal retrieval module 221, the signal conversion module 222, and/or the like) and data consumers (e.g., the signal informatics module 223, the interface module 225, and/or the like) within the signal conversion system 200. The service orchestration module 224 can then implement a buffering mechanism (e.g., circular buffers, ring buffers, and/or the like) to temporarily store incoming data and manage potential variations in data production and consumption rates. Additionally, the service orchestration module 224 can apply flow control algorithms (e.g., backpressure mechanisms, rate limiting, and/or the like) to prevent data overflow or underflow situations that could impact system performance. For example, during a high-volume customer support scenario, the service orchestration module 224 can manage multiple concurrent signal data streams 274 from various communication channels, ensuring that each stream can be properly routed to the appropriate processing modules without overwhelming system resources. In another example, the service orchestration module 224 can dynamically adjust the streaming rate of video conference data based on network conditions and processing capabilities, ensuring smooth real-time analysis without introducing significant latency. In yet another example, the service orchestration module 224 can implement a priority-based streaming mechanism for emergency response communications, ensuring that critical signal data streams 274 receive immediate attention and processing.

In some implementations, the service orchestration module 224 can generate a service configuration 275 and request the signal informatics module 223 to generate specific informatics output data based on service requests 277 received from the control entity 262-2. The service configuration 275 can be a structured set of parameters and instructions (e.g., a JSON object, an XML document, a protocol buffer, and/or the like) that defines the operational requirements and processing logic for the signal informatics module 223. To generate the service configuration 275, the service orchestration module 224 can first analyze the incoming service request 277 from the control entity 262-2, which can be received through the interface module 225. The service orchestration module 224 can implement natural language processing techniques (e.g., intent recognition, entity extraction, semantic parsing, and/or the like) to interpret the service request 277 and identify the specific informatics requirements. Based on this analysis, the service orchestration module 224 can then construct the service configuration 275 by selecting appropriate processing modules, setting analysis parameters, and defining output formats. The service orchestration module 224 can also incorporate contextual information (e.g., user preferences, historical data, system load, and/or the like) from the signal event repository 252 to optimize the service configuration 275. Once generated, the service configuration 275 can be transmitted to the signal informatics module 223 along with the relevant signal data stream 274 for processing. For example, when a customer support supervisor submits a service request 277 for real-time sentiment analysis of ongoing calls, the service orchestration module 224 can generate a service configuration 275 that specifies the use of advanced sentiment analysis algorithms, defines sentiment score thresholds for alerts, and sets the output format to a real-time dashboard visualization. In another example, if a compliance officer requests an audit of all customer interactions for potential policy violations, the service orchestration module 224 can create a service configuration 275 that activates specific compliance checking modules, defines the relevant policy rules to be applied, and specifies the generation of a detailed audit report with timestamped violations. In yet another example, when a sales manager requests a comprehensive analysis of customer objections during product demonstrations, the service orchestration module 224 can generate a service configuration 275 that combines topic modeling, sentiment analysis, and frequency analysis modules to identify and categorize objections, specifying the output as an interactive report with drill-down capabilities.

In some implementations, the service orchestration module 224 can stream signal data (e.g., the original communications signal data 271 or the converted signal data 273) to the signal informatics module 223. The service orchestration module 224 can implement advanced data streaming protocols (e.g., Apache Kafka, Apache Flink, Apache Storm, and/or the like) to ensure efficient and reliable transmission of large volumes of signal data in real-time. To initiate the streaming process, the service orchestration module 224 can first establish a secure connection with the signal informatics module 223, implementing encryption and authentication mechanisms (e.g., TLS/SSL, OAuth, JWT, and/or the like) to protect the integrity and confidentiality of the transmitted data. The service orchestration module 224 can then apply data serialization techniques (e.g., Apache Avro, Protocol Buffers, MessagePack, and/or the like) to convert the signal data into a compact, efficient format for transmission. Additionally, the service orchestration module 224 can implement adaptive streaming algorithms that dynamically adjust the data transmission rate based on network conditions and the processing capacity of the signal informatics module 223. This can involve techniques such as dynamic compression, chunked transfer encoding, and adaptive bitrate streaming. For example, during a large-scale video conference with multiple participants, the service orchestration module 224 can stream both the original video and audio signals (communications signal data 271) and the real-time transcriptions (converted signal data 273) to the signal informatics module 223 for comprehensive analysis of verbal and non-verbal communication patterns. In another example, when processing a high-volume customer support chat system, the service orchestration module 224 can implement a prioritized streaming mechanism that ensures urgent customer issues are immediately streamed to the signal informatics module 223 for rapid response generation. In yet another example, for long-term trend analysis of call center performance, the service orchestration module 224 can stream historical converted signal data 273 from the communication signal repository 250 to the signal informatics module 223 in batches, optimizing data transfer and processing efficiency for large-scale analytics.

In some implementations, the service orchestration module 224 can stream signal data or real-time generated informatics data to the control entity 262-2. The service orchestration module 224 can implement real-time data visualization techniques (e.g., WebSocket-based live updates, server-sent events, long polling, and/or the like) to provide the control entity 262-2 with immediate access to processed information and insights. To facilitate this streaming process, the service orchestration module 224 can first establish a persistent connection with the interface module 225, which can be responsible for rendering the data on the control entity's 262-2 display device. The service orchestration module 224 can then implement data formatting and transformation processes to ensure the streamed data can be efficiently rendered and easily interpreted by the control entity 262-2. This can involve techniques such as data aggregation, summarization, and adaptive resolution based on the control entity's 262-2 device capabilities and preferences. Additionally, the service orchestration module 224 can implement intelligent caching mechanisms (e.g., client-side caching, edge caching, and/or the like) to optimize data delivery and reduce latency, especially for frequently accessed or computationally intensive informatics data. For example, during an ongoing customer support call, the service orchestration module 224 can stream real-time sentiment analysis results, transcription updates, and suggested responses to the control entity 262-2, enabling immediate interventions and personalized customer interactions. In another example, for a large-scale marketing campaign analysis, the service orchestration module 224 can stream continuously updated engagement metrics, conversion rates, and demographic breakdowns to marketing managers, allowing for real-time campaign optimization. In yet another example, in a financial trading environment, the service orchestration module 224 can stream real-time market sentiment analysis derived from news feeds and social media signals to traders, enabling rapid decision-making based on the latest market trends and sentiments.

In some implementations, the service orchestration module 224 can generate a service configuration 275 that details the specific operations and/or requirements imposed on the services of the signal informatics module 223 to create specific output data or informatics data 276. The service configuration 275 can be a comprehensive set of instructions and parameters (e.g., a structured configuration file, a dynamic object, a set of API calls, and/or the like) that governs the behavior and output of the signal informatics module 223. To generate this detailed service configuration 275, the service orchestration module 224 can first analyze the incoming service request 277 and any associated contextual information (e.g., user role, historical preferences, system capabilities, and/or the like) stored in the signal event repository 252. The service orchestration module 224 can then implement a rule-based decision engine or a machine learning model (e.g., decision trees, random forests, neural networks, and/or the like) to determine the optimal combination of informatics services and their respective configurations. This process can involve selecting specific analytical algorithms, setting threshold values, defining data aggregation levels, and specifying output formats. The service orchestration module 224 can also incorporate dynamic resource allocation strategies to optimize the utilization of computing resources based on the current system load and the priority of the service request 277. For example, when generating a service configuration 275 for a comprehensive customer interaction analysis, the service orchestration module 224 can specify the use of sentiment analysis with custom emotion categories, topic modeling with industry-specific taxonomies, and anomaly detection with adaptive thresholds, all while defining the output as a multi-layered interactive dashboard. In another example, for a real-time compliance monitoring service configuration 275, the service orchestration module 224 can detail the use of specific regulatory rule sets, define real-time alert triggers, and specify the generation of audit logs with cryptographic signatures for non-repudiation. In yet another example, when creating a service configuration 275 for a predictive maintenance system in an industrial setting, the service orchestration module 224 can specify the use of time series analysis algorithms, define sensor data fusion techniques, and set up automated alert escalation procedures based on predicted failure probabilities.

In some implementations, the service orchestration module 224 can be integrated within the signal informatics module 223 as an embedded service orchestration layer. This integration can allow for tighter coupling between the orchestration logic and the analytical services, enabling more efficient resource utilization and faster response times. To implement this embedded architecture, the service orchestration module 224 can be designed as a modular component (e.g., a software library, a set of microservices, a plugin system, and/or the like) that can be directly incorporated into the codebase of the signal informatics module 223. The embedded service orchestration layer can implement advanced inter-process communication mechanisms (e.g., shared memory, message passing interfaces, and/or the like) to facilitate rapid data exchange and coordination between orchestration functions and analytical services. Additionally, the embedded service orchestration layer can leverage internal data structures and processing pipelines of the signal informatics module 223, allowing for optimized data flow and reduced overhead in service configuration and execution. The integration can also enable the service orchestration module 224 to have more fine-grained control over the allocation of computing resources within the signal informatics module 223, potentially implementing dynamic load balancing and task prioritization at a lower level of abstraction. For example, in a high-frequency trading analysis system, the embedded service orchestration layer can dynamically adjust the allocation of processing power between different analytical models based on real-time market conditions, ensuring critical analyses receive priority without the overhead of inter-module communication. In another example, for a complex natural language processing pipeline, the embedded service orchestration layer can optimize the sequencing and parallelization of various NLP tasks (e.g., tokenization, part-of-speech tagging, named entity recognition, and semantic parsing) within the signal informatics module 223, maximizing throughput and minimizing latency. In yet another example, in a multi-modal sentiment analysis system processing audio, video, and text data simultaneously, the embedded service orchestration layer can implement fine-grained resource sharing between different analytical models, ensuring balanced processing across all modalities while adapting to varying input data characteristics in real-time.

In some implementations, the interface module 225 can facilitate synchronized communication 279 with the control entity 262-2 and process service requests 277 and an analytic data stream 278. The interface module 225 can be a specialized software component designed to manage interactions between the signal conversion system 200 and the control entity 262-2, ensuring seamless data exchange and real-time updates.

The interface module 225 can implement various communication protocols (e.g., WebSocket, Server-Sent Events, long polling) to establish and maintain a synchronized communication 279 channel with the control entity 262-2. This synchronized communication 279 can enable real-time bidirectional data exchange, allowing the control entity 262-2 to receive immediate updates and send requests without significant latency.

In some cases, the interface module 225 can process service requests 277 received from the control entity 262-2. These service requests 277 can include queries for specific information, commands to perform certain analyses, or requests for system configuration changes. The interface module 225 can parse and validate these requests, ensuring they are properly formatted and comprise all necessary parameters before forwarding them to the appropriate components of the signal conversion system 200 for processing.

The interface module 225 can also handle the analytic data stream 278, which can comprise processed information and insights generated by the signal informatics module 223. This analytic data stream 278 can include various types of data, such as sentiment analysis results, conversation summaries, or performance metrics. The interface module 225 can format and organize this data for presentation to the control entity 262-2, potentially implementing data visualization techniques or real-time dashboards to enhance data comprehension and usability.

In some implementations, the interface module 225 can leverage the display 240 of the computing server 202 to present information to the control entity 262-2. The interface module 225 can generate and update user interface elements, such as charts, graphs, or text displays, to reflect the latest data from the analytic data stream 278.

The interface module 225 can also interact with other components of the signal conversion system 200 to fulfill service requests 277 and manage data flow. For example, the interface module 225 can communicate with the service orchestration module 224 to initiate specific analytical processes based on user requests. Additionally, the interface module 225 can access the signal event repository 252 or the communication signal repository 250 to retrieve historical data or context information when needed to supplement real-time analytics.

In some cases, the interface module 225 can implement security measures to protect the synchronized communication 279 channel and ensure that only authorized control entities 262-2 can access sensitive information or initiate certain system actions. These security measures can include encryption, authentication protocols, and access control mechanisms.

The interface module 225 can also provide customization options, allowing control entities 262-2 to tailor their interface preferences, such as data visualization styles, alert thresholds, or dashboard layouts. These customizations can be stored in the signal event repository 252 and applied consistently across sessions to enhance user experience and efficiency.

Figure 3:
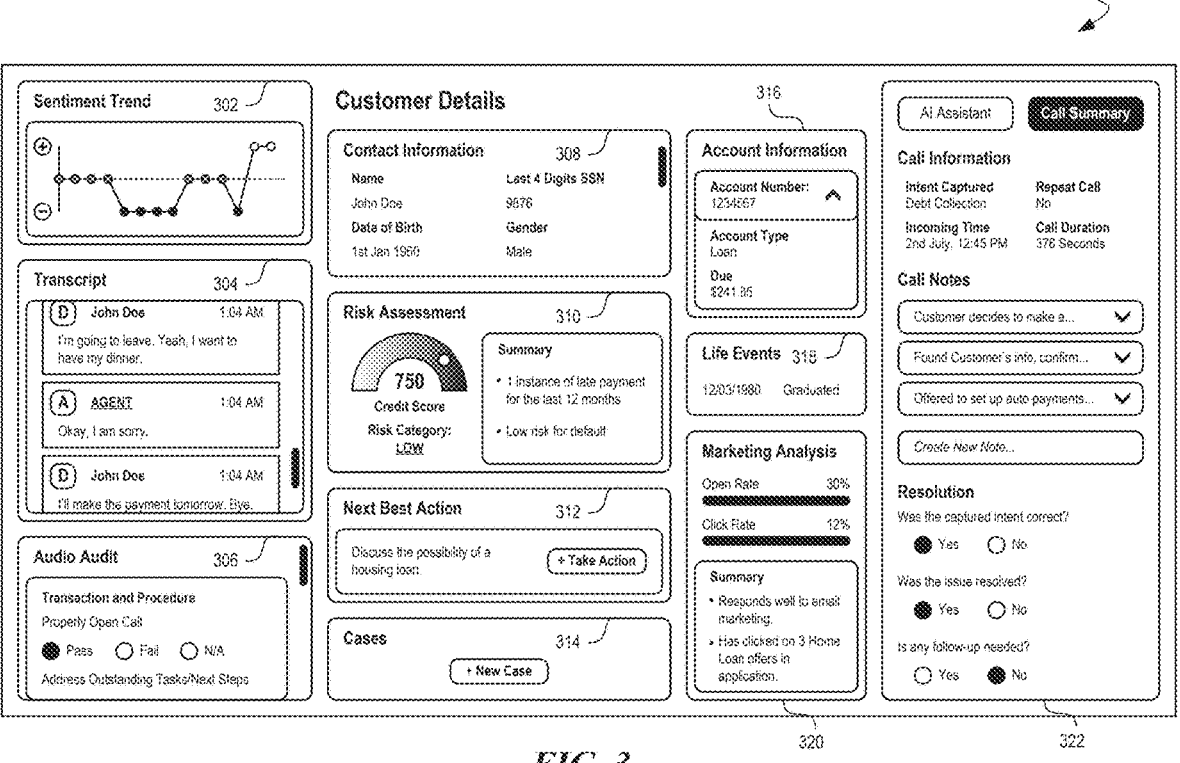
FIG. 3 is a block diagram that illustrates an example graphical user interface that demonstrates aspects of the signal conversion system in accordance with some implementations of the present technology.

FIG. 3 is a block diagram that illustrates an example graphical user interface 300 ("interface 300") that demonstrates aspects of the signal conversion system in accordance with some implementations of the present technology. Interface 300 is implemented using components of the example computer environment 100 illustrated and described in more detail with reference to FIG. 1. Likewise, implementations of interface 300 can include different and/or additional components or can be connected in different ways. Interface 300 is a visual interface that enables users to interact with electronic devices using graphical elements (e.g., windows, icons, buttons, and/or the like) rather than text-based commands.

In some implementations, the interface 300 can include multiple panels and displays that provide comprehensive information and controls for managing digital communications. The interface 300 can be a graphical user interface (GUI) implemented by the interface module 225 of the signal conversion system 200. The interface 300 can be displayed on the display device 718 of the computing system 700, allowing the control entity 262-2 to interact with various components of the digital communication system 260. The interface 300 can be designed to present real-time analytics, historical data, and actionable insights derived from the converted signal data 273 processed by the signal informatics module 223.

In some implementations, the interface 300 can include a sentiment graph 302 that displays emotional patterns over time during a digital communication session. The sentiment graph 302 can be a visual representation of affective scoring distributions generated by the signal informatics module 223 based on the converted signal data 273. The sentiment graph 302 can utilize various graphical elements (e.g., line charts, bar graphs, heat maps, and/or the like) to illustrate the fluctuations in sentiment throughout the conversation. The x-axis of the sentiment graph 302 can represent the timeline of the communication, while the y-axis can indicate the intensity or type of sentiment detected. The sentiment graph 302 can employ color coding (e.g., green for positive sentiment, red for negative sentiment, yellow for neutral sentiment, and/or the like) to enhance the visual interpretation of emotional patterns. In some cases, the sentiment graph 302 can include multiple layers or tracks to represent different emotional dimensions simultaneously. For example, the sentiment graph 302 can display separate lines for customer satisfaction, frustration levels, and engagement scores, allowing the control entity 262-2 to identify correlations between these emotional aspects. In another example, the sentiment graph 302 can incorporate interactive elements that enable the control entity 262-2 to zoom in on specific time segments or hover over data points to view detailed sentiment breakdowns. In yet another example, the sentiment graph 302 can include annotations or markers indicating key events or turning points in the conversation that significantly impacted the emotional trajectory.

In some implementations, the interface 300 can feature a conversation transcript 304 that displays the dialogue between participants in the digital communication. The conversation transcript 304 can be a textual representation of the converted signal data 273 generated by the signal conversion module 222 from the original communications signal data 271. The conversation transcript 304 can be continuously updated in real-time as the digital communication progresses, providing the control entity 262-2 with an immediate and searchable record of the interaction. The conversation transcript 304 can implement advanced formatting techniques to enhance readability and highlight important information. These techniques can include speaker identification (e.g., different colors or labels for each participant), timestamp annotations, and automatic highlighting of key terms or phrases identified by the signal informatics module 223. The conversation transcript 304 can also incorporate interactive elements that allow the control entity 262-2 to quickly navigate through the conversation history. For example, the conversation transcript 304 can include a scrollable interface with a mini-map overview, enabling rapid navigation to specific points in long conversations. In another example, the conversation transcript 304 can feature a search function that allows the control entity 262-2 to find specific keywords or phrases within the transcript, with results highlighted and easily accessible. In yet another example, the conversation transcript 304 can include expandable sections for detailed context, such as definitions of technical terms or links to relevant knowledge base articles, enhancing the control entity's 262-2 understanding of complex discussions.

In some implementations, the interface 300 can include an audit panel 306 for tracking transaction procedures and compliance with predefined protocols. The audit panel 306 can be a dynamic display that presents real-time updates on the adherence to industry-specific guidelines, company policies, or regulatory requirements during the digital communication. The audit panel 306 can leverage the automated audit functionality of the signal informatics module 223, which analyzes the converted signal data 273 against predefined audit templates stored in the signal event repository 252. The audit panel 306 can present a checklist-style interface, showing required steps or disclosures and their current status (e.g., completed, pending, or missed). Each item in the audit panel 306 can be color-coded to indicate compliance status, with green representing completed items, yellow for pending items, and red for missed or noncompliant items. The audit panel 306 can also include timestamps for when each audit item was addressed or flagged, providing a chronological record of the compliance process. For example, in a financial advisory context, the audit panel 306 can track the completion of required risk disclosures, verification of client identity, and documentation of investment suitability assessments. In another example, for a healthcare consultation, the audit panel 306 can monitor adherence to patient privacy protocols, informed consent procedures, and documentation of medical history reviews. In yet another example, in a customer service scenario, the audit panel 306 can track greeting protocols, problem-solving procedures, and customer satisfaction checkpoints, providing real-time feedback on agent performance and identifying areas for improvement.

In some implementations, the interface 300 can feature a risk assessment display 310 that presents a visual representation of potential risks or vulnerabilities associated with the current digital communication. The risk assessment display 310 can utilize data processed by the signal informatics module 223 to generate a comprehensive risk profile based on various factors extracted from the converted signal data 273. The risk assessment display 310 can implement a multi-dimensional visualization approach, combining numerical scores, graphical indicators, and textual descriptions to convey complex risk information in an easily digestible format. The central element of the risk assessment display 310 can be a dynamic gauge or meter that indicates the overall risk level, ranging from low to high. This gauge can be supplemented by a breakdown of specific risk factors, each represented by its own sub-gauge or score. The risk assessment display 310 can also include trend indicators that show how risk levels have changed over the course of the communication or in comparison to historical averages. For example, in a credit assessment scenario, the risk assessment display 310 can show a credit score gauge alongside subscores for factors such as payment history, credit utilization, and length of credit history. In another example, for a cybersecurity application, the risk assessment display 310 can visualize threat levels across different attack vectors, such as phishing attempts, malware risks, and data breach vulnerabilities. In yet another example, in a customer churn prediction context, the risk assessment display 310 can present probabilities of customer attrition based on factors like recent complaint history, product usage patterns, and competitor interactions.

In some implementations, the interface 300 can include an action recommendation panel 312 that provides suggestions for next steps or interventions based on the current state of the digital communication. The action recommendation panel 312 can leverage the predictive capabilities of the signal informatics module 223, which analyzes patterns in the converted signal data 273 and compares them against historical data stored in the signal event repository 252 to generate contextually relevant recommendations. The action recommendation panel 312 can present a prioritized list of suggested actions, each accompanied by a brief rationale and an estimated impact score. The recommendations can be dynamically updated as the conversation progresses, reflecting changes in sentiment, risk assessment, or other relevant factors. The action recommendation panel 312 can implement an interactive interface that allows the control entity 262-2 to explore each recommendation in detail, view supporting data, and initiate actions directly from the panel. For example, in a customer support scenario, the action recommendation panel 312 can suggest offering a specific discount to a frustrated customer, escalating the issue to a specialist, or providing step-by-step troubleshooting guidance based on the detected problem type. In another example, for a sales negotiation, the action recommendation panel 312 can propose alternative product configurations, flexible pricing options, or value-added services tailored to the client's expressed needs and objections. In yet another example, in a healthcare triage situation, the action recommendation panel 312 can suggest specific diagnostic questions, recommend immediate interventions, or propose follow-up appointment scheduling based on the patient's reported symptoms and medical history.

In some implementations, the interface 300 can feature a case management interface 314 that enables the control entity 262-2 to organize and track multiple communication sessions or ongoing cases. The case management interface 314 can integrate data from the signal informatics module 223 and the communication signal repository 250 to provide a comprehensive overview of active and historical cases. The case management interface 314 can implement a tabbed or card-based layout, allowing the control entity 262-2 to quickly switch between different cases or communication threads. Each case within the interface can display key information such as participant details, case status, priority level, and a brief summary of recent activities. The case management interface 314 can also include filtering and sorting options to help the control entity 262-2 manage large volumes of cases efficiently. Advanced search functionality can allow for quick retrieval of specific cases based on various criteria such as participant name, case type, or key terms from the conversation. For example, in a customer support environment, the case management interface 314 can display a list of open support tickets, showing customer names, issue types, time elapsed since the last interaction, and current status (e.g., awaiting customer response, in progress, pending escalation). In another example, for a legal practice, the case management interface 314 can organize client consultations, showing case types, upcoming deadlines, assigned attorneys, and links to relevant documents. In yet another example, in a project management context, the case management interface 314 can present an overview of ongoing projects, displaying progress indicators, team member assignments, and upcoming milestones.

In some implementations, the interface 300 can include an account information panel 316 that displays relevant details about the participant user 262-1 involved in the current digital communication. The account information panel 316 can retrieve and present data from various sources, including the communication signal repository 250, external customer relationship management (CRM) systems, and other relevant databases integrated with the signal conversion system 200. The account information panel 316 can organize information into categories such as personal details, account history, product or service subscriptions, and recent interactions. The panel can implement a collapsible or tabbed structure to manage the display of extensive information without overwhelming the interface. The account information panel 316 can also include dynamic elements that update in real-time based on the ongoing conversation, highlighting relevant information as topics are discussed. For example, in a banking context, the account information panel 316 can display the customer's account numbers, current balances, recent transactions, and any active loans or credit cards. In another example, for a telecommunications provider, the account information panel 316 can show the customer's current plan details, device information, usage statistics, and any reported issues or service requests. In yet another example, in an educational setting, the account information panel 316 can present a student's enrollment status, current courses, academic performance history, and any accommodations or special requirements.

In some implementations, the interface 300 can feature a life events panel 318 that highlights significant dates and milestones relevant to the participant user 262-1. The life events panel 318 can leverage data from the communication signal repository 250 and external data sources to compile a timeline of important events that can influence the current communication or future interactions. The life events panel 318 can implement a visual timeline interface, displaying events chronologically with icons or color coding to indicate different types of events. The panel can include both past events and upcoming milestones, providing context for the current interaction and opportunities for proactive engagement. Each event in the life events panel 318 can be interactive, allowing the control entity 262-2 to access more detailed information or related actions when clicked. For example, in a financial advisory context, the life events panel 318 can display significant financial milestones such as job changes, major purchases, investment maturity dates, and upcoming retirement plans. In another example, for a healthcare provider, the life events panel 318 can show important medical dates such as previous surgeries, medication start dates, upcoming appointments, and recommended screening schedules. In yet another example, in a customer loyalty program, the life events panel 318 can highlight membership anniversaries, reward point expiration dates, and personalized offer eligibility based on the customer's purchase history and preferences.

In some implementations, the interface 300 can include a marketing analysis section 320 that presents engagement metrics and campaign performance data relevant to the participant user 262-1. The marketing analysis section 320 can integrate data from the signal informatics module 223, the communication signal repository 250, and external marketing platforms to provide a comprehensive view of the participant user's 262-1 interactions with marketing efforts. The marketing analysis section 320 can implement a dashboard-style interface with various widgets and visualizations to represent different aspects of marketing engagement. Key performance indicators (KPIs) such as open rates, click-through rates, conversion rates, and customer lifetime value can be prominently displayed with trend indicators showing changes over time. The marketing analysis section 320 can also include segmentation data, showing how the participant user 262-1 fits into various marketing segments and how their engagement compares to segment averages. Interactive elements within the section can allow the control entity 262-2 to drill down into specific campaigns or channels for more detailed analysis. For example, in an e-commerce context, the marketing analysis section 320 can display email campaign performance metrics, social media engagement statistics, and personalized product recommendation effectiveness for the specific customer. In another example, for a subscription-based service, the marketing analysis section 320 can show usage patterns, feature adoption rates, and the impact of various upsell or cross-sell campaigns on the customer's subscription level. In yet another example, in a B2B sales environment, the marketing analysis section 320 can present account-based marketing metrics, including engagement with thought leadership content, webinar attendance, and the progression of marketing qualified leads to sales qualified leads.

In some implementations, the interface 300 can feature a resolution status panel 322 that tracks the progress and outcomes of the current digital communication session. The resolution status panel 322 can utilize real-time data from the signal informatics module 223 to provide an up-to-date view of how effectively the communication can be addressing the participant user's 262-1 needs or objectives. The resolution status panel 322 can implement a visual progress tracker, such as a multi-step process flow or a percentagebased completion bar, to indicate the current stage of resolution. The panel can include key milestones or checkpoints that need to be achieved for successful resolution, with each milestone updating dynamically as the conversation progresses. The resolution status panel 322 can also display a summary of actions taken, decisions made, and any pending items that require follow-up. Color coding can be used to quickly indicate the status of different elements, with green representing completed or resolved items, yellow for in-progress items, and red for unaddressed or problematic areas. For example, in a technical support scenario, the resolution status panel 322 can show the progression through stages such as problem identification, troubleshooting steps attempted, solution implementation, and verification of issue resolution. In another example, for a sales process, the resolution status panel 322 can track the advancement through stages like needs assessment, product demonstration, handling objections, proposal submission, and closing. In yet another example, in a dispute resolution context, the resolution status panel 322 can monitor the progress through phases such as issue clarification, exploration of options, negotiation of terms, and agreement finalization.

In some implementations, the interface 300 can include a chat interface that enables the control entity 262-2 to input natural language queries, which are responded to via a service of the signal informatics module 223. The chat interface can be an interactive component within the interface 300 that allows the control entity 262-2 to engage in a conversational interaction with the signal conversion system 200. The chat interface can implement natural language processing techniques to interpret the control entity's 262-2 queries and generate contextually relevant responses. The chat interface can be designed with a familiar messaging-style layout, featuring a message input field at the bottom and a scrollable conversation history above. The service of the signal informatics module 223 responsible for handling these queries can leverage advanced language models and the wealth of data available in the communication signal repository 250 and signal event repository 252 to provide accurate and helpful responses. The chat interface can support various types of inputs, including text, voice commands, and even the ability to upload files or images for analysis. Responses from the system can include text, formatted data tables, visualizations, or links to relevant sections of the interface 300. For example, the control entity 262-2 can input a query like "What can be the main issues reported by customers this week?" and receive a summarized response with key statistics and trends extracted from recent communication data. In another example, the control entity 262-2 can ask, "Show me the sentiment trend for this customer over the past three interactions," prompting the system to generate and display a custom sentiment graph focusing on the specified timeframe. In yet another example, the control entity 262-2 can request, "Suggest next best action based on current conversation context," triggering the system to analyze the ongoing communication and provide tailored recommendations for moving the interaction forward effectively.

FIG. 4 is a flow diagram that illustrates an example process 400 for mapping converted signal data to events in accordance with some implementations of the disclosed technology. The process 400 can be performed by a system (e.g., signal conversion system 200) configured to process monitored communications signal data (e.g., recorded audio of an online teleconference meeting) to generate and/or extract contemporaneous signal informatics data, including recommended interventive user actions. In one example, the system includes at least one hardware processor and at least one non-transitory memory storing instructions, which, when executed by the at least one hardware processor, cause the system to perform the process 400. In another example, the system includes a non-transitory, computer-readable storage medium comprising instructions recorded thereon, which, when executed by at least one data processor, cause the system to perform the process 400.

At block 402, the system can monitor digital communications signal data (e.g., audio, alphanumeric text, visual images, and/or the like) transmitted between two or more users (e.g., a recorded live conversation between a service user and a service control entity). In some implementations, the system can determine (e.g., from the communication signal repository 250) a stored communications signal profile that corresponds to a first participant user (e.g., a service user) of the monitored digital communications. In some implementations, the system can retrieve and/or store the monitored digital communications signal data as discrete signal chunks (e.g., an ordered sequence of signal data groups, a series of diarized communication data, and/or the like) of one or more signal modalities. For example, the system can store the signal data as discrete signal chunks of one or more signal modalities comprising alphanumeric characters, audio signals, visual images, tactile motion information, compressed files, other transmissible signal representations that are interpretable via machine code, and/or a combination thereof. In some implementations, the system can monitor the digital communications signal data via a communicative interface that is accessible between the two or more users such that the communicative interface facilitates an audio call, a video conference, an email exchange, a text chat, and/or a combination thereof.

At block 404, the system can convert the retrieved discrete signal chunks of the monitored digital communications signal data into a standardized and/or normalized representation. For example, in response to determining that storage of a discrete signal chunk from the monitored signal data is complete, the system can automatically convert a subset of signal data within the discrete signal chunk into an alphanumeric signal set (e.g., a text-based transcript). In some implementations, the system can automatically convert the discrete signal chunk at a timestamp, or within a time interval (e.g., a threshold range within the timestamp), associated with detected completion of retrieving and/or storing the discrete signal chunk. For example, the system can automatically convert the discrete signal chunk into a corresponding set of alphanumeric signal data at a first timestamp (e.g., execution time of signal data conversion) that is within a threshold range (e.g., +/−1, 3, 5 milliseconds) of a second timestamp corresponding to complete storage of the discrete signal chunk. In some implementations the system can selectively convert subsets of signal data within the discrete signal chunk into alphanumeric signal sets such that the subsets of signal data correspond to a specified signal modality of the one or more signal modalities (e.g., isolating a select data modality within the discrete signal chunk). For example, the system can selectively convert a first subset of signal data (e.g., from the discrete signal chunk) that corresponds to a first signal modality (e.g., audio signals) into a first alphanumeric signal set and a second subset of signal data (e.g., from the same discrete signal chunk) that corresponds to a second signal modality (e.g., text-based chat messages) into a second alphanumeric signal set.

At block 406, the system can input the converted alphanumeric signal set (e.g., a transcript of the digital communication signal data) and the stored communications signal profile of the first user into a machine learning model (e.g., a statistical inference model, a natural language processing algorithm, a generative machine learning model, and/or the like) to generate an event scoring distribution (e.g., a mapping of event probabilities) that maps the discrete signal chunk to a signal event category set associated with the digital communications signal data. In some implementations, the system can input a plurality of converted alphanumeric signal sets (e.g., component transcripts converted from different discrete signal chunks) into the machine learning model to generate an event scoring distribution that maps a plurality of discrete signal chunks (e.g., chunks corresponding to the plurality of alphanumeric signal sets) to a signal event category set associated with the digital communications signal data.

In some implementations, the system can input the converted alphanumeric signal set of the discrete signal chunk into a second machine learning model to generate an affective scoring distribution (e.g., a probability/similarity score mappings) that maps the discrete signal chunk to an affective domain set (e.g., user sentiment labels) for the participant user. In some implementations, the system can input the stored communications signal profile of the participant user into the second machine learning model, along with the alphanumeric signal set, to generate the affective scoring distribution. In some implementations, the system can input the alphanumeric signal set and the affective scoring distribution into the first machine learning model to generate an event scoring distribution that maps the discrete signal chunk to a signal event category set, thereby enhancing the mapping of the discrete signal chunk data to event categories with additional context of affective scores associated with the participant user (e.g., user sentiment metrics).

In some implementations, the system can access (e.g., from a remote database) an entity attribute model that maps signal data attributes to one or more categories of distinct entities (e.g., named entity recognition). In some implementations, the system can input the alphanumeric signal set of the discrete signal chunk and the entity attribute model into a second machine learning model to generate an entity set (e.g., derived from the one or more categories of distinct entities) that comprises distinct entities corresponding to identified alphanumeric signal subsets of the alphanumeric signal set. For example, the system can input a text-based transcript and an entity attribute model that maps keywords or phrases to predefined entities (e.g., a user, a service, an object, an action, a quantity, and/or the like) into a machine learning model to generate a set of predefined entities, where the predefined entities within the generated set map to specific text components within the text transcript (e.g., a select sequence of alphanumeric characters, a set of keywords within the text transcript, and/or the like). Accordingly, the system can transmit for display (e.g., via a user interface of the control entity) a visual representation of the alphanumeric signal set (e.g., a graphical view of the text transcript), where the visual representation comprises graphical mappings between the identified alphanumeric signal subsets and the distinct entities of the entity set (e.g., visual links between demarcated entity blocks within the graphical view of the text transcript).

In some implementations, the system can access (e.g., from a remote database) an event compliance schema that comprises one or more required signal event categories for the digital communications signal data. For example, the system can access an event compliance data structure that enumerates a set, or sequence (e.g., an ordered list), of communication events (e.g., discussion of select topics within the digital communication, implementation of one or more interventive user actions, and/or the like) that are required to be present within the digital communication (e.g., within the signal data) between the participant user and the control entity. In some implementations, the system can determine (e.g., from the signal event category set) a signal event category subset comprising signal event categories that satisfy the one or more required signal event categories of the event compliance schema. In response to failure to detect at least one required signal event category of the event compliance schema in the signal event category subset, the system can transmit (e.g., to the control entity) an alert indicating deviation of the digital communications signal data from the event compliance schema. In some implementations, the system can also generate for display (e.g., at the user interface of the control entity) corrective interventive user actions, along with the alert, to satisfy the one or more required signal event categories of the event compliance schema.

At block 408, the system can determine a signal event divergence score via comparing a first event scoring distribution of a first alphanumeric signal set and a second event scoring distribution of a second alphanumeric signal set. For example, the system can compare individual event distribution scores that map a first transcript (e.g., generated for a portion of signal data from the digital communication at an earlier point in time) to one or more event categories with the individual event distribution scores that map a second transcript (e.g., generated for a portion of signal data from the digital communication at a later point in time) to the one or more event categories. Based on comparing the scoring attributes between the first and the second event scoring distributions, the system can calculate a statistical difference that indicates a divergence in scoring patterns that map alphanumeric subsets (e.g., text transcripts) to the one or more event categories.

In some implementations, the system can transmit, to the control entity, an interventive user action that is selectively identified that enables the control entity to transform new signal data from the digital communications signal data (e.g., user implemented actions for pivoting forward signal data of digital communication). For example, in response to an absence of a prior interventive user action (e.g., absence of a prior determined signal event category), the system can automatically select and transmit a new interventive user action to the control entity. In some implementations, the system selects an interventive user action for the control entity when at least one event category within the set of event categories satisfies a scoring threshold for the corresponding score within the event scoring distribution.

At block 410, the system can evaluate whether the signal event divergence score satisfies a divergence threshold (e.g., a scoring range indicating tolerance of changing scoring distribution patterns prior to determining a new interventive user action). In response to the signal divergence score satisfying the divergence threshold (e.g., not within tolerance range), the system can generate a new interventive user action for the control entity, as further described with respect to block 412. In response to the signal divergence score failing to satisfy the divergence threshold (e.g., within tolerance range), the system can skip generation of a new interventive user action and iterate back to block 404. In some implementations, the system can iteratively repeat the one or more operations described within blocks 404-410 until a termination event (e.g., the end of a communication session, communication interruption between the participant user and the control entity, a period of inactivity, of a predetermined duration, of at least one participant in a communication session) is detected for the digital communication.

At block 412, the system can transmit, to the control entity, an interventive user action that enables the control entity to transform the digital communications signal data. For example, in response to the signal event divergence score (e.g., of the latest event scoring distribution) satisfying the divergence threshold, the system can selectively identify a new interventive user action based on the signal event category set that is determined for the latest discrete signal chunk (e.g., via the latest event scoring distribution). In some implementations, the new interventive user action enables the control entity to transform eh digital communications signal data differently from prior interventive user actions presented to the control entity. In some implementations, the system can iteratively repeat the one or more operations described within blocks 404-412 until a termination event is detected for the digital communication.

In some implementations, the system can generate, via a semantic encoder, an embedded content identifier for a natural-language request that is received from the control entity (e.g., via a chat interface), where the natural-language request comprises a query for information associated with the digital communications signal data. In some implementations, the system can determine a historical alphanumeric signal set that corresponds to prior digital communications comprising similar signal data to the current digital communications signal data. For example, the system can compare the embedded content identifier of the natural-language request to embedded content identifiers of signal data for prior digital communications between the participant user and the control entity to identify the historical alphanumeric signal set. In some implementations, the system can input the natural-language request and the historical alphanumeric signal set into a generative machine learning model (e.g., a large language model, a natural language processing algorithm, and/or the like) to output a human-readable narrative that responds to the natural-language request. Accordingly, the system can transmit for display, via a user interface of the control entity, the human-readable narrative.

In some implementations, in response to detecting a termination event that prevents storage of new discrete signal chunks of the digital communications signal data, the system can determine a discrete signal chunk set that comprises discrete signal chunks corresponding to timestamps between a first timestamp (e.g., start of monitoring digital communication, generation of first discrete signal chunk, and/or the like) and a second timestamp (e.g., time of termination event). In some implementations, the system can convert a signal data subset within the discrete signal chunk set into an alphanumeric signal set. In some implementations, the system can input the alphanumeric signal set into a generative machine learning to output a human-readable narrative that summarizes contents of the digital communications signal data between the first and the second timestamps. Accordingly, the system can transmit for display, via a user interface of the control entity, the human-readable narrative.

In some implementations, the system can selectively identify, based on the signal event category set, at least one delayed communication action for processing the stored discrete signal chunks after termination of the digital communications signal data. Accordingly, in response to detecting a termination event that prevents storage of new discrete signal chunks of the digital communications signal data, the system can automatically execute the at least one delayed communication action.

Example Machine Learning Architecture

Figure 5:
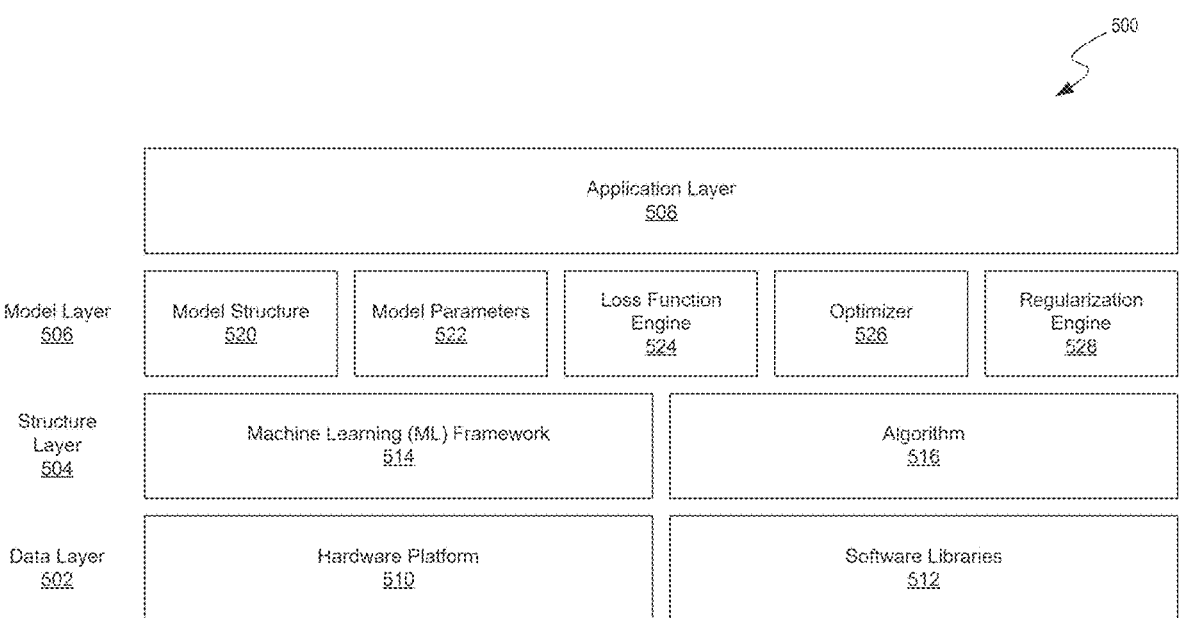
FIG. 5 illustrates a layered architecture of an artificial intelligence (AI) system that can implement the ML models of the signal conversion system in accordance with some implementations of the present technology.

FIG. 5 illustrates a layered architecture of an artificial intelligence (AI) system 500 that can implement the ML models of the signal conversion system 200 of FIGS. 2A-2B, in accordance with some implementations of the present technology. Example ML models can include one or more executable statistical inference algorithms stored at computing databases 115, 125 and/or retrieved from external service providers (e.g., a third-party cloud host) via the network 130 of the example computing environment 100. Accordingly, the computing environment 100 and/or components thereof (e.g., servers 110, 120, databases 115, 125, network 130, and/or the like) can include, or be incorporated within, one or more components of the AI system 500. The AI system 500 provides a comprehensive software stack capable of hosting suitable runtime environments for one or more operations of ML models, as further described herein.

The modules of the signal conversion system 200 can be leverage one or more components of the layered architecture of the AI system 500 to perform their respective functions with high computational efficiency. For example, the signal retrieval module 221 can use the data layer 502 to access and process raw signal data through the hardware platform 510 and software libraries 512, enabling efficient ingestion of multi-modal communications. In another example, the signal conversion module 222 can implement transformer-based models from the model layer 506, with the model structure 520 defining encoder-decoder architectures optimized for speech-to-text conversion and semantic analysis. In another example, the signal informatics module 223 can deploy specialized machine learning models with custom loss function engines 524 and regularization engines 528 to generate accurate event scoring distributions and affective analyses. In another example, the service orchestration module 224 can interface with the structure layer 504, utilizing the machine learning framework 514 to dynamically allocate computational resources across concurrent processing tasks. In another example, the interface module 225 can leverage the application layer 508 to translate complex model outputs into actionable visualizations. All modules can access the machine learning repository 256 which stores pre-trained model parameters 522 and algorithm 516 modules specifically optimized for real-time signal-to-event conversion tasks, with continuous refinement through federated learning techniques that preserve data privacy while improving model performance across distributed computing environments.

As shown, the AI system 500 can include a set of layers, which conceptually organize elements within an example network topology for the AI system's architecture to implement a particular AI model. Generally, an AI model is a computer-executable program implemented by the AI system 500 that analyses input data to generate inferential output data (e.g., a classification label for input feature vectors). Information can pass through each layer of the AI system 500 to generate outputs for the AI model. The layers can include a data layer 502, a structure layer 504, a model layer 506, and an application layer 508. The algorithm 516 of the structure layer 504 and the model structure 520 and model parameters 522 of the model layer 506 together form an example AI model. The optimizer 526, loss function engine 524, and regularization engine 528 work to refine and optimize the AI model, and the data layer 502 provides resources and support for application of the AI model by the application layer 508.

The data layer 502 acts as the foundation of the AI system 500 by preparing data for the AI model. As shown, the data layer 502 can include two sub-layers: a hardware platform 510 and one or more software libraries 512. The hardware platform 510 can be designed to perform operations for the AI model and include computing resources for storage, memory, logic and networking, such as the resources described in relation to FIGS. 1 and 7. The hardware platform 510 can process amounts of data using one or more servers. The servers can perform backend operations such as matrix calculations, parallel calculations, machine learning training, and the like. Examples of servers used by the hardware platform 510 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors, such as application specific integrated circuits (ASIC). GPUs are electric circuits that were originally designed for graphics manipulation and output but can be used for AI applications due to their vast computing and memory resources. GPUs use a parallel structure that generally makes their processing more efficient than that of CPUs. In some instances, the hardware platform 510 can include computing resources, (e.g., servers, memory, etc.) offered by a cloud services provider. The hardware platform 510 can also include computer memory for storing data about the AI model, application of the AI model, and training data for the AI model. The computer memory can be a form of random-access memory (RAM), such as dynamic RAM, static RAM, and non-volatile RAM.

The software libraries 512 can be thought of suites of data and programming code, including executables, used to control the computing resources of the hardware platform 510. The programming code can include low-level primitives (e.g., fundamental language elements) that form the foundation of one or more low-level programming languages, such that servers of the hardware platform 510 can use the low-level primitives to carry out specific operations. The low-level programming languages do not require much, if any, abstraction from a computing resource's instruction set architecture, allowing them to run quickly with a small memory footprint. Examples of software libraries 512 that can be included in the AI system 500 include INTEL Math Kernel Library, NVIDIA cuDNN, EIGEN, and OpenBLAS.

The structure layer 504 can include an ML framework 514 and an algorithm 516. The ML framework 514 can be thought of as an interface, library, or tool that allows users to build and deploy the AI model. The ML framework 514 can include an open-source library, an application programming interface (API), a gradient-boosting library, an ensemble method, and/or a deep learning toolkit that work with the layers of the AI system facilitate development of the AI model. For example, the ML framework 514 can distribute processes for application or training of the AI model across multiple resources in the hardware platform 510. The ML framework 514 can also include a set of pre-built components that have the functionality to implement and train the AI model and allow users to use pre-built functions and classes to construct and train the AI model. Thus, the ML framework 514 can be used to facilitate data engineering, development, hyperparameter tuning, testing, and training for the AI model. Examples of ML frameworks 514 that can be used in the AI system 500 include TENSORFLOW, PYTORCH, SCIKIT-LEARN, KERAS, LightGBM, RANDOM FOREST, and AMAZON WEB SERVICES.

The algorithm 516 can be an organized set of computer-executable operations used to generate output data from a set of input data and can be described using pseudocode. The algorithm 516 can include complex code that allows the computing resources to learn from new input data and create new/modified outputs based on what was learned. In some implementations, the algorithm 516 can build the AI model through being trained while running computing resources of the hardware platform 510. This training allows the algorithm 516 to make predictions or decisions without being explicitly programmed to do so. Once trained, the algorithm 516 can run at the computing resources as part of the AI model to make predictions or decisions, improve computing resource performance, or perform tasks. The algorithm 516 can be trained using supervised learning, unsupervised learning, semi-supervised learning, and/or reinforcement learning.

Using supervised learning, the algorithm 516 can be trained to learn patterns (e.g., map input data to output data) based on labeled training data. The training data can be labeled by an external user or operator. For instance, a user may collect a set of training data, such as by capturing data from sensors, images from a camera, outputs from a model, and the like. Furthermore, training data can include unprocessed and/or unstructured communication signal data (e.g., recorded audio data, alphanumeric text data, graphical image data, and/or the like), a converted signal data and/or format (e.g., a segmented alphanumeric text transcription of original signal data), a signal event category (e.g., predetermined type of event, or intent, identified within communication signal data), a signal event distribution (e.g., a probabilistic distribution), a signal communication profile (e.g., historical communication signal data patterns associated with one or more select users), and/or a signal informatics data (e.g., an affection or sentiment evaluation metric, a signal content summarization, a recommended interventive user action, an entity identification and/or mapping, a user condition or vulnerability assessment, and/or other relevant analytic information extracted from, or processed from, transforming incoming communications signal data) of the signal conversion system 200 described in relation to FIGS. 2A-2B. The user may label the training data based on one or more classes and trains the AI model by inputting the training data into the algorithm 516. The algorithm determines how to label the new data based on the labeled training data. The user can facilitate collection, labeling, and/or input via the ML framework 514. In some instances, the user may convert the training data to a set of feature vectors for input to the algorithm 516. Once trained, the user can test the algorithm 516 on new data to determine if the algorithm 516 is predicting accurate labels for the new data. For example, the user can use cross-validation methods to test the accuracy of the algorithm 516 and retrain the algorithm 516 on new training data if the results of the cross-validation are below an accuracy threshold.

Supervised learning can involve classification and/or regression. Classification techniques involve teaching the algorithm 516 to identify a category of new observations based on training data and are used when input data for the algorithm 516 is discrete. Said differently, when learning through classification techniques, the algorithm 516 receives training data labeled with categories (e.g., classes) and determines how features observed in the training data (e.g., various claim elements, policy identifiers, tokens extracted from unstructured data) relate to the categories (e.g., risk propensity categories, claim leakage propensity categories, complaint propensity categories). Once trained, the algorithm 516 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques involve estimating relationships between independent and dependent variables and are used when input data to the algorithm 516 is continuous. Regression techniques can be used to train the algorithm 516 to predict or forecast relationships between variables. To train the algorithm 516 using regression techniques, a user can select a regression method for estimating the parameters of the model. The user collects and labels training data that is input to the algorithm 516 such that the algorithm 516 is trained to understand the relationship between data features and the dependent variable(s). Once trained, the algorithm 516 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill-in missing data for machine-learning based pre-processing operations.

Under unsupervised learning, the algorithm 516 learns patterns from unlabeled training data. In particular, the algorithm 516 is trained to learn hidden patterns and insights of input data, which can be used for data exploration or for generating new data. Here, the algorithm 516 does not have a predefined output, unlike the labels output when the algorithm 516 is trained using supervised learning. Said another way, unsupervised learning is used to train the algorithm 516 to find an underlying structure of a set of data, group the data according to similarities, and represent that set of data in a compressed format.

A few techniques can be used in supervised learning: clustering, anomaly detection, and techniques for learning latent variable models. Clustering techniques involve grouping data into different clusters that include similar data, such that other clusters comprise dissimilar data. For example, during clustering, data with possible similarities remains in a group that has less or no similarities to another group. Examples of clustering techniques density-based methods, hierarchical based methods, partitioning methods, and grid-based methods. In one example, the algorithm 516 may be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 516 may be trained to be an Isolation Forest, local outlier factor (LOF) algorithm, or K-nearest neighbor (k-NN) algorithm. Latent variable techniques involve relating observable variables to a set of latent variables. These techniques assume that the observable variables are the result of an individual's position on the latent variables and that the observable variables have nothing in common after controlling for the latent variables. Examples of latent variable techniques that may be used by the algorithm 516 include factor analysis, item response theory, latent profile analysis, and latent class analysis.

The model layer 506 implements the AI model using data from the data layer and the algorithm 516 and ML framework 514 from the structure layer 504, thus enabling decision-making capabilities of the AI system 500. The model layer 506 includes a model structure 520, model parameters 522, a loss function engine 524, an optimizer 526, and a regularization engine 528.

The model structure 520 describes the architecture of the AI model of the AI system 500. The model structure 520 defines the complexity of the pattern/relationship that the AI model expresses. Examples of structures that can be used as the model structure 520 include decision trees, support vector machines, regression analyses, Bayesian networks, Gaussian processes, genetic algorithms, and artificial neural networks (or, simply, neural networks). The model structure 520 can include a number of structure layers, a number of nodes (or neurons) at each structure layer, and activation functions of each node. Each node's activation function defines how to node converts data received to data output. The structure layers may include an input layer of nodes that receive input data, an output layer of nodes that produce output data. The model structure 520 may include one or more hidden layers of nodes between the input and output layers. The model structure 520 can be an Artificial Neural Network (or, simply, neural network) that connects the nodes in the structured layers such that the nodes are interconnected. Examples of neural networks include Feedforward Neural Networks, convolutional neural networks (CNNs), Recurrent Neural Networks (RNNs), Autoencoder, and Generative Adversarial Networks (GANs).

The model parameters 522 represent the relationships learned during training and can be used to make predictions and decisions based on input data. The model parameters 522 can weight and bias the nodes and connections of the model structure 520. For instance, when the model structure 520 is a neural network, the model parameters 522 can weight and bias the nodes in each layer of the neural networks, such that the weights determine the strength of the nodes and the biases determine the thresholds for the activation functions of each node. The model parameters 522, in conjunction with the activation functions of the nodes, determine how input data is transformed into desired outputs. The model parameters 522 can be determined and/or altered during training of the algorithm 516.

The loss function engine 524 can determine a loss function, which is a metric used to evaluate the AI model's performance during training. For instance, the loss function engine 524 can measure the difference between a predicted output of the AI model and the actual output of the AI model and is used to guide optimization of the AI model during training to minimize the loss function. The loss function may be presented via the ML framework 514, such that a user can determine whether to retrain or otherwise alter the algorithm 516 if the loss function is over a threshold. In some instances, the algorithm 516 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cosh loss function, and quantile loss function.

The optimizer 526 adjusts the model parameters 522 to minimize the loss function during training of the algorithm 516. In other words, the optimizer 526 uses the loss function generated by the loss function engine 524 as a guide to determine what model parameters lead to the most accurate AI model. Examples of optimizers include Gradient Descent (GD), Adaptive Gradient Algorithm (AdaGrad), Adaptive Moment Estimation (Adam), Root Mean Square Propagation (RMSprop), Radial Base Function (RBF) and Limited-memory BFGS (L-BFGS). The type of optimizer 526 used may be determined based on the type of model structure 520 and the size of data and the computing resources available in the data layer 502.

The regularization engine 528 executes regularization operations. Regularization is a technique that prevents over- and under-fitting of the AI model. Overfitting occurs when the algorithm 516 is overly complex and too adapted to the training data, which can result in poor performance of the AI model. Underfitting occurs when the algorithm 516 is unable to recognize even basic patterns from the training data such that it cannot perform well on training data or on validation data. The optimizer 526 can apply one or more regularization techniques to fit the algorithm 516 to the training data properly, which helps constraint the resulting AI model and improves its ability for generalized application. Examples of regularization techniques include lasso (L1) regularization, ridge (L2) regularization, and elastic (L1 and L2 regularization).

The application layer 508 describes how the AI system 500 is used to solve problem or perform tasks. In an example implementation, the application layer 508 can be communicatively coupled (e.g., display application data, receive user input, and/or the like) to an interactable user interface of the signal conversion system 200 of FIGS. 2A-2B.

Example Transformer for Machine Learning Models

To assist in understanding the present disclosure, some concepts relevant to neural networks and machine learning are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN may encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Auto-regressive Models, among others.

DNNs are often used as ML-based models for modeling complex behaviors (e.g., human language, image recognition, object classification) in order to improve the accuracy of outputs (e.g., more accurate predictions) such as, for example, as compared with models with fewer layers. In the present disclosure, the term "ML-based model" or more simply "ML model" may be understood to refer to a DNN.

Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a language model), the training dataset may be a collection of text documents, referred to as a text corpus (or simply referred to as a corpus). The corpus may represent a language domain (e.g., a single language), a subject domain (e.g., scientific papers), and/or may encompass another domain or domains, be they larger or smaller than a single language or subject domain. For example, a relatively large, multilingual and non-subject-specific corpus may be created by extracting text from online webpages and/or publicly available social media posts. Training data may be annotated with ground truth labels (e.g., each data entry in the training dataset may be paired with a label), or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data may be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters may be determined based on the measured performance of one or more of the trained ML models, and the first step of training (i.e., with the training set) may begin again on a different ML model described by the new set of determined hyperparameters. In this way, these steps may be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training an ML model. Backpropagation is used to adjust (also referred to as update) the value of the parameters in the ML model, with the goal of optimizing the objective function. For example, a defined loss function is calculated by forward propagation of an input to obtain an output of the ML model and a comparison of the output value with the target value. Back-propagation calculates a gradient of the loss function with respect to the parameters of the ML model, and a gradient algorithm (e.g., gradient descent) is used to update (i.e., "learn") the parameters to reduce the loss function. Back-propagation is performed iteratively so that the loss function is converged or minimized. Other techniques for learning the parameters of the ML model may be used. The process of updating (or learning) the parameters over many iterations is referred to as training. Training may be carried out iteratively until a convergence condition is met (e.g., a pre-defined maximum number of iterations has been performed, or the value outputted by the ML model is sufficiently converged with the desired target value), after which the ML model is considered to be sufficiently trained. The values of the learned parameters may then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural language that has been trained generically on pub-licly-available text corpora may be, e.g., fine-tuned by further training using specific training samples. The specific training samples can be used to generate language in a certain style or in a certain format. For example, the ML model can be trained to generate a blog post having a particular style and structure with a given topic.

Some concepts in ML-based language models are now discussed. It may be noted that, while the term "language model" has been commonly used to refer to a ML-based language model, there could exist non-ML language models. In the present disclosure, the term "language model" may be used as shorthand for an ML-based language model (i.e., a language model that is implemented using a neural network or other ML architecture), unless stated otherwise. For example, unless stated otherwise, the "language model" encompasses LLMs.

A language model may use a neural network (typically a DNN) to perform natural language processing (NLP) tasks. A language model may be trained to model how words relate to each other in a textual sequence, based on probabilities. A language model may comprise hundreds of thousands of learned parameters or in the case of a large language model (LLM) may comprise millions or billions of learned param-eters or more. As non-limiting examples, a language model can generate text, translate text, summarize text, answer questions, write code (e.g., Phyton, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

In recent years, there has been interest in a type of neural network architecture, referred to as a transformer, for use as language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based lan-guage models are described herein, it should be understood that the present disclosure may be applicable to any ML-based language model, including language models based on other neural network architectures such as recurrent neural network (RNN)-based language models.

Figure 6:
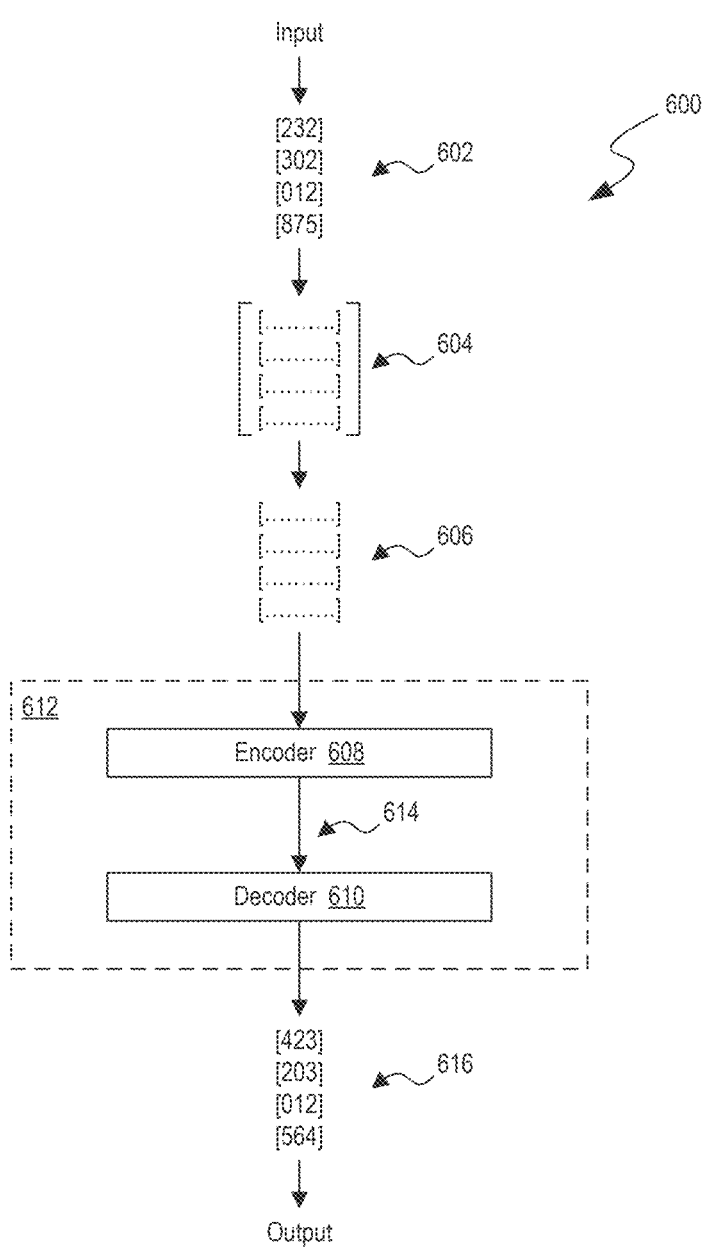
FIG. 6 is a block diagram of an example transformer that can implement aspects of the present technology.

FIG. 6 is a block diagram of an example transformer 612 that can implement aspects of the present technology. A transformer is a type of neural network architecture that uses self-attention mechanisms to generate predicted output based on input data that has some sequential meaning (i.e., the order of the input data is meaningful, which is the case for most text input). Self-attention is a mechanism that relates different positions of a single sequence to compute a representation of the same sequence. Although transformer-based language models are described herein, it should be understood that the present disclosure may be applicable to any ML-based language model, including language models based on other neural network architectures such as recur-rent neural network (RNN)-based language models.

The modules of the signal conversion system 200 can leverage the transformer architecture to enhance their respective functionalities. For example, the signal retrieval module 221 can utilize the embedding matrix 604 to convert incoming discrete signal chunks 272 into initial vector representations suitable for further processing. In another example, the signal conversion module 222 can implement the encoder 608 component to transform these embeddings into feature vectors 614 that capture the semantic meaning of communications signal data 271. In another example, the signal informatics module 223 can employ the decoder 610 architecture to generate alphanumeric representations and event scoring distributions from the feature vectors 614. In another example, the service orchestration module 224 can modify attention mechanisms (e.g., weights and/or variable parameters) within the transformer 612 to prioritize relevant features when determining appropriate interventive actions. In another example, the interface module 225 can leverage the output tokens 616 generated by the transformer 612 to present contextually relevant information to users through the display 240. Additionally, the machine learning reposi-tory 256 can store pre-trained transformer models with domain-specific weights optimized for different communi-cation modalities, enabling efficient transfer learning across various signal conversion tasks.

The transformer 612 includes an encoder 608 (which can comprise one or more encoder layers/blocks connected in series) and a decoder 610 (which can comprise one or more decoder layers/blocks connected in series). Generally, the encoder 608 and the decoder 610 each include a plurality of neural network layers, at least one of which can be a self-attention layer. The parameters of the neural network layers can be referred to as the parameters of the language model.

The transformer 612 can be trained to perform certain functions on a natural language input. For example, the functions include summarizing existing content, brainstorming ideas, writing a rough draft, fixing spelling and grammar, and translating content. Summarizing can include extracting key points from an existing content in a high-level summary. Brainstorming ideas can include generating a list of ideas based on provided input. For example, the ML model can generate a list of names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some embodiments, the transformer 612 is trained to perform certain functions on other input formats than natural language input. For example, the input can include objects, images, audio content, or video content, or a combination thereof.

The transformer 612 can be trained on a text corpus that is labeled (e.g., annotated to indicate verbs, nouns) or unlabeled. Large language models (LLMs) can be trained on a large unlabeled corpus. The term "language model," as used herein, can include an ML-based language model (e.g., a language model that is implemented using a neural network or other ML architecture), unless stated otherwise. Some LLMs can be trained on a large multi-language, multi-domain corpus to enable the model to be versatile at a variety of language-based tasks such as generative tasks (e.g., generating human-like natural language responses to natural language input). FIG. 6 illustrates an example of how the transformer 612 can process textual input data. Input to a language model (whether transformer-based or otherwise) typically is in the form of natural language that can be parsed into tokens. It should be appreciated that the term "token" in the context of language models and Natural Language Processing (NLP) has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some examples, a token can correspond to a portion of a word.

For example, the word "greater" can be represented by a token for [great] and a second token for [er]. In another example, the text sequence "write one summary" can be parsed into the segments [write], [one], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph), an [EOT] token can be another special token that indicates the end of the textual sequence, other tokens can provide formatting information, etc.

In FIG. 6, a short sequence of tokens 602 corresponding to the input text is illustrated as input to the transformer 612. Tokenization of the text sequence into the tokens 602 can be performed by some pre-processing tokenization module such as, for example, a byte-pair encoding tokenizer (the "pre" referring to the tokenization occurring prior to the processing of the tokenized input by the LLM), which is not shown in FIG. 6 for simplicity. In general, the token sequence that is inputted to the transformer 612 can be of any length up to a maximum length defined based on the dimensions of the transformer 612. Each token 602 in the token sequence is converted into an embedding vector (also referred to simply as an embedding 606). An embedding 606 is a learned numerical representation (such as, for example, a vector) of a token that captures some semantic meaning of the text segment represented by the token 602. The embedding 606 represents the text segment corresponding to the token 602 in a way such that embeddings corresponding to semantically related text are closer to each other in a vector space than embeddings corresponding to semantically unrelated text. For example, assuming that the words "write," "one," and "summary" each correspond to, respectively, a "write" token, an "one" token, and a "summary" token when tokenized, the embedding 606 corresponding to the "write" token will be closer to another embedding corresponding to the "jot down" token in the vector space as compared to the distance between the embedding 606 corresponding to the "write" token and another embedding corresponding to the "summary" token.

The vector space can be defined by the dimensions and values of the embedding vectors. Various techniques can be used to convert a token 602 to an embedding 606. For example, another trained ML model can be used to convert the token 602 into an embedding 606. In particular, another trained ML model can be used to convert the token 602 into an embedding 606 in a way that encodes additional information into the embedding 606 (e.g., a trained ML model can encode positional information about the position of the token 602 in the text sequence into the embedding 606). In some examples, the numerical value of the token 602 can be used to look up the corresponding embedding in an embedding matrix 604 (which can be learned during training of the transformer 612).

The generated embeddings 606 are input into the encoder 608. The encoder 608 serves to encode the embeddings 606 into feature vectors 614 that represent the latent features of the embeddings 606. The encoder 608 can encode positional information (i.e., information about the sequence of the input) in the feature vectors 614. The feature vectors 614 can have very high dimensionality (e.g., on the order of thousands or tens of thousands), with each element in a feature vector 614 corresponding to a respective feature. The numerical weight of each element in a feature vector 614 represents the importance of the corresponding feature. The space of all possible feature vectors 614 that can be generated by the encoder 608 can be referred to as the latent space or feature space.

Conceptually, the decoder 610 is designed to map the features represented by the feature vectors 614 into meaningful output, which can depend on the task that was assigned to the transformer 612. For example, if the transformer 612 is used for a translation task, the decoder 610 can map the feature vectors 614 into text output in a target language different from the language of the original tokens 602. Generally, in a generative language model, the decoder 610 serves to decode the feature vectors 614 into a sequence of tokens. The decoder 610 can generate output tokens 616 one by one. Each output token 616 can be fed back as input to the decoder 610 in order to generate the next output token 616. By feeding back the generated output and applying self-attention, the decoder 610 is able to generate a sequence of output tokens 616 that has sequential meaning (e.g., the resulting output text sequence is understandable as a sentence and obeys grammatical rules). The decoder 610 can generate output tokens 616 until a special [EOT] token (indicating the end of the text) is generated. The resulting sequence of output tokens 616 can then be converted to a text sequence in post-processing. For example, each output token 616 can be an integer number that corresponds to a vocabulary index. By looking up the text segment using the vocabulary index, the text segment corresponding to each output token 616 can be retrieved, the text segments can be concatenated together, and the final output text sequence can be obtained.

In some examples, the input provided to the transformer 612 includes instructions to perform a function on an existing text. In some examples, the input provided to the transformer includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text. For example, the input can include the question "What is the weather like in Australia?" and the output can include a description of the weather in Australia.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available to the public online. GPT-3 has a very large number of learned parameters (on the order of hundreds of billions), is able to accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as, for example, the Internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ a plurality of processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

Inputs to an LLM can be referred to as a prompt, which is a natural language input that includes instructions to the LLM to generate a desired output. A computer system can generate a prompt that is provided as input to the LLM via its API. As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Example Computer System

Figure 7:
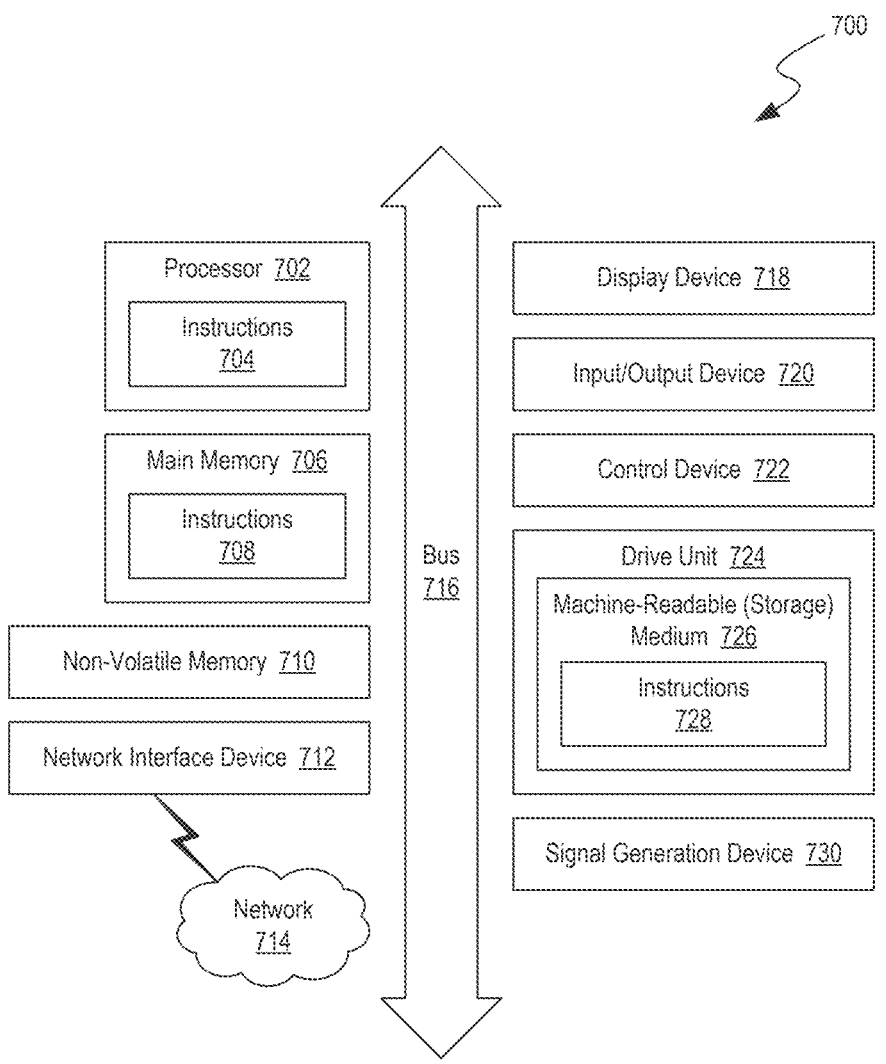
FIG. 7 is a block diagram that illustrates an example of a computer system in which at least some operations described herein can be implemented.

FIG. 7 is a block diagram that illustrates an example of a computer system 700 in which at least some operations described herein can be implemented. As shown, the computer system 700 can include: one or more processors 702, main memory 706, non-volatile memory 710, a network interface device 712, a video display device 718, an input/output device 720, a control device 722 (e.g., keyboard and pointing device), a drive unit 724 that includes a machine-readable (storage) medium 726, and a signal generation device 730 that are communicatively connected to a bus 716. The bus 716 represents one or more physical buses and/or point-to-point connections that are connected by appropriate bridges, adapters, or controllers. Various common components (e.g., cache memory) are omitted from FIG. 7 for brevity. Instead, the computer system 700 is intended to illustrate a hardware device on which components illustrated or described relative to the examples of the figures and any other components described in this specification can be implemented.

The computer system 700 can take any suitable physical form. For example, the computing system 700 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 700. In some implementations, the computer system 700 can be an embedded computer system, a system-on-chip (SOC), a single-board computer system (SBC), or a distributed system such as a mesh of computer systems, or it can include one or more cloud components in one or more networks. Where appropriate, one or more computer systems 700 can perform operations in real time, in near real time, or in batch mode.

The network interface device 712 enables the computing system 700 to mediate data in a network 714 with an entity that is external to the computing system 700 through any communication protocol supported by the computing system 700 and the external entity. Examples of the network interface device 712 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 706, non-volatile memory 710, machine-readable medium 726) can be local, remote, or distributed. Although shown as a single medium, the machine-readable medium 726 can include multiple media (e.g., a centralized/distributed database and/or associated caches and servers) that store one or more sets of instructions 728. The machine-readable medium 726 can include any medium that is capable of storing, encoding, or carrying a set of instructions for execution by the computing system 700. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 710, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computing system 700 to perform operations to execute elements involving the various aspects of the disclosure.

Further Examples

In some implementations, the techniques described herein relate to a computer-implemented method for a signal-to-event conversion platform, the method including monitoring digital communications signal data transmitted between two or more users, wherein a first user is linked to a stored communications signal profile, and wherein the digital communications signal data is stored as discrete signal chunks of one or more signal modalities. In some implementations, the method can include converting, upon detecting a first timestamp corresponding to completion of storing a first discrete signal chunk from the digital communications signal data, a first signal data subset within the first discrete signal chunk into a first alphanumeric signal set, the first signal data subset corresponding to at least one signal modality of the one or more signal modalities. In some implementations, the method can include responsive to detecting a first discrete signal chunk not found within the discrete signal chunk set of the monitored digital communications signal data, converting signal data of the first discrete signal chunk into a first alphanumeric signal set. In some implementations, the method can include inputting the first alphanumeric signal set and the stored communications signal profile of the first user into a machine learning model to generate a first scoring distribution that maps the first discrete signal chunk to a first signal event category set associated with the digital communications signal data. In some implementations, the method can include transmitting, to a second user of the two or more users, a first interventive user action that is selectively identified based on the first signal event category set, the first interventive user action enabling the second user to transform new signal data from the digital communications signal data. In some implementations, the method can include converting, upon detecting a second timestamp corresponding to completion of storing a second discrete signal chunk from the digital communications signal data, a second signal data subset within the second discrete signal chunk into a second alphanumeric signal set, the second signal data subset corresponding to the at least one signal modality of the one or more signal modalities. In some implementations, the method can include inputting the second alphanumeric signal set, the first alphanumeric signal set, and the stored communications signal profile of the first user into the machine learning model to generate a second scoring distribution that maps the first and the second discrete signal chunks to a second signal event category set associated with the digital communications signal data. In some implementations, the method can include determining a signal event divergence score via comparing the first and the second scoring distributions of the first and the second signal event category sets respectively. In some implementations, the method can include responsive to the signal event divergence score failing to satisfy a tolerance threshold, transmitting, to the second user, a second interventive user action that is selectively identified based on the second signal event category set, the second interventive user action enabling the second user to transform the digital communications signal data differently from the first interventive user action.

In some implementations, the second timestamp is within a predetermined time interval from the first timestamp.

In some implementations, the at least one signal modality is a first signal modality, and the method can include converting, upon detecting the first timestamp, a third signal data subset within the first discrete signal chunk into a third alphanumeric signal set, the third signal data subset corresponding to a second signal modality of the one or more signal modalities. In some implementations, the method can include inputting the first alphanumeric signal set, the third alphanumeric signal set, and the stored communications signal profile of the first user into the machine learning model to generate a third scoring distribution that maps the first discrete signal chunk to a third signal event category set.

In some implementations, the method can include generating, via a semantic encoder, an embedded content identifier for a natural-language request that is received from the second user, the natural-language request including a query for information associated with the digital communications signal data. In some implementations, the method can include determining, via comparing the embedded content identifier of the natural-language request to embedded content identifiers of signal data for prior digital communications between the two or more users, a historical alphanumeric signal set that corresponds to prior digital communications including similar signal data to the digital communications signal data. In some implementations, the method can include inputting the natural-language request and the historical alphanumeric signal set into a generative machine learning model to output a human-readable narrative that responds to the natural-language request. In some implementations, the method can include transmitting for display, via a user interface of the second user, the human-readable narrative.

In some implementations, the machine learning model is a first machine learning model, and the method can include inputting the first alphanumeric signal set and the stored communications signal profile of the first user into a second machine learning model to generate an affective scoring distribution that maps the first discrete signal chunk to an affective domain set for the first user. In some implementations, the method can include inputting the first alphanumeric signal set, the affective scoring distribution, and the stored communications signal profile of the first user into the first machine learning model to generate a third scoring distribution that maps the first discrete signal chunk to a third signal event category set.

In some implementations, the machine learning model is a first machine learning model, and the method can include accessing, from a remote database, an entity attribute model that maps signal data attributes to one or more categories of distinct entities. In some implementations, the method can include inputting the first alphanumeric signal set and the entity attribute model into a second machine learning model to generate an entity set that includes distinct entities corresponding to identified alphanumeric signal subsets of the first alphanumeric signal set. In some implementations, the method can include transmitting for display, via a user interface of the second user, a visual representation of the first alphanumeric signal set, the visual representation including graphical mappings between the identified alphanumeric signal subsets and the distinct entities of the entity set.

In some implementations, the method can include responsive to detecting, upon detecting a third timestamp, a termination event preventing storage of new discrete signal chunks of the digital communications signal data, determining a discrete signal chunk set that includes discrete signal chunks corresponding to timestamps between the first timestamp and the third timestamp. In some implementations, the method can include converting a third signal data subset within the discrete signal chunk set into a third alphanumeric signal set, the third signal data subset corresponding to the at least one signal modality of the one or more signal modalities. In some implementations, the method can include inputting the third alphanumeric signal set into a generative machine learning to output a human-readable narrative that summarizes contents of the digital communications signal data between the first and the third timestamps. In some implementations, the method can include transmitting for display, via a user interface of the second user, the human-readable narrative.

In some implementations, the method can include selectively identifying, based on the first signal event category set, at least one delayed communication action for processing the stored discrete signal chunks after termination of the digital communications signal data. In some implementations, the method can include responsive to detecting a termination event preventing storage of new discrete signal chunks of the digital communications signal data, automatically executing the at least one delayed communication action.

In some implementations, the method can include accessing, from a remote database, an event compliance schema including one or more required signal event categories for the digital communications signal data. In some implementations, the method can include determining, from the first signal event category set, a signal event category subset including signal event categories that satisfy the one or more required signal event categories of the event compliance schema. In some implementations, the method can include responsive to failure to detect at least one required signal event category of the event compliance schema in the signal event category subset, transmitting, to the second user, an alert indicating deviation of the digital communications signal data from the event compliance schema.

In some implementations, the one or more signal modalities can include alphanumeric characters, audio signals, visual images, tactile motion information, compressed files, other transmissible signal representations that are interpretable via machine code, or a combination thereof.

In some implementations, the digital communications signal data is monitored via a communicative interface accessible between the two or more users, the communicative interface facilitating an audio call, a video conference, an email exchange, a text chat, or a combination thereof.

REMARKS

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any specific portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. One or more non-transitory, computer-readable storage media having computer-executable instructions stored thereon, the instructions, when executed by at least one data processor of an adaptive signal-to-event conversion system, cause the system to:

monitor digital communications signal data transmitted between two or more users, wherein a first user is linked to a stored communications signal profile, and wherein the digital communications signal data is stored as discrete signal chunks of one or more signal modalities;

convert, upon detecting a first timestamp corresponding to completion of storing a first discrete signal chunk from the digital communications signal data, a first signal data subset within the first discrete signal chunk into a first alphanumeric signal set, the first signal data subset corresponding to at least one signal modality of the one or more signal modalities;

input the first alphanumeric signal set and the stored communications signal profile of the first user into a first machine learning model to generate a first scoring distribution that maps the first discrete signal chunk to a first signal event category set associated with the digital communications signal data;

transmit, to a second user of the two or more users, a first interventive user action that is selectively identified based on the first signal event category set, the first interventive user action enabling the second user to transform new signal data from the digital communications signal data;

convert, upon detecting a second timestamp corresponding to completion of storing a second discrete signal chunk from the digital communications signal data, a second signal data subset within the second discrete signal chunk into a second alphanumeric signal set, the second signal data subset corresponding to the at least one signal modality of the one or more signal modalities;

input the second alphanumeric signal set, the first alphanumeric signal set, and the stored communications signal profile of the first user into the first machine learning model to generate a second scoring distribution that maps the first and the second discrete signal chunks to a second signal event category set associated with the digital communications signal data;

input the first alphanumeric signal set and the stored communications signal profile of the first user into a second machine learning model to generate an affective scoring distribution that maps the first discrete signal chunk to an affective domain set for the first user;

input the first alphanumeric signal set, the affective scoring distribution, and the stored communications signal profile of the first user into the first machine learning model to generate a third scoring distribution that maps the first discrete signal chunk to a third signal event category set;

determine a signal event divergence score via comparing the first, the second, and the third scoring distributions of the first, the second, and the third signal event category sets respectively; and responsive to the signal event divergence score failing to satisfy a tolerance threshold, transmit, to the second user, a second interventive user action that is selectively identified based on the second signal event category set, the second interventive user action enabling the second user to transform the digital communications signal data differently from the first interventive user action.

2. The one or more non-transitory, computer-readable storage media of claim 1, wherein the second timestamp is within a predetermined time interval from the first timestamp.

3. The one or more non-transitory, computer-readable storage media of claim 1, wherein the at least one signal modality is a first signal modality, and wherein the instructions further cause the system to:

convert, upon detecting the first timestamp, a third signal data subset within the first discrete signal chunk into a third alphanumeric signal set, the third signal data subset corresponding to a second signal modality of the one or more signal modalities; and input the first alphanumeric signal set, the third alphanumeric signal set, and the stored communications signal profile of the first user into the machine learning model to generate a third scoring distribution that maps the first discrete signal chunk to a third signal event category set.

4. The one or more non-transitory, computer-readable storage media of claim 1, wherein the instructions further cause the system to:

generate, via a semantic encoder, an embedded content identifier for a natural-language request that is received from the second user, the natural-language request comprising a query for information associated with the digital communications signal data;

determine, via comparing the embedded content identifier of the natural-language request to embedded content identifiers of signal data for prior digital communications between the two or more users, a historical alphanumeric signal set that corresponds to prior digital communications comprising similar signal data to the digital communications signal data;

input the natural-language request and the historical alphanumeric signal set into a generative machine learning model to output a human-readable narrative that responds to the natural-language request; and transmit for display, via a user interface of the second user, the human-readable narrative.

5. The one or more non-transitory, computer-readable storage media of claim 1, wherein the machine learning model is a first machine learning model, and wherein the instructions further cause the system to:

access, from a remote database, an entity attribute model that maps signal data attributes to one or more categories of distinct entities;

input the first alphanumeric signal set and the entity attribute model into a second machine learning model to generate an entity set that comprises distinct entities corresponding to identified alphanumeric signal subsets of the first alphanumeric signal set; and transmit for display, via a user interface of the second user, a visual representation of the first alphanumeric signal set, the visual representation comprising graphical mappings between the identified alphanumeric signal subsets and the distinct entities of the entity set.

6. The one or more non-transitory, computer-readable storage media of claim 1, wherein the instructions further cause the system to:

responsive to detecting, upon detecting a third timestamp, a termination event preventing storage of new discrete signal chunks of the digital communications signal data:

determine a discrete signal chunk set that comprises discrete signal chunks corresponding to timestamps between the first timestamp and the third timestamp;

convert a third signal data subset within the discrete signal chunk set into a third alphanumeric signal set, the third signal data subset corresponding to the at least one signal modality of the one or more signal modalities;

input the third alphanumeric signal set into a generative machine learning to output a human-readable narrative that summarizes contents of the digital communications signal data between the first and the third timestamps; and transmit for display, via a user interface of the second user, the human-readable narrative.

7. The one or more non-transitory, computer-readable storage media of claim 1, wherein the instructions further cause the system to:

selectively identify, based on the first signal event category set, at least one delayed communication action for processing the stored discrete signal chunks after termination of the digital communications signal data; and responsive to detecting a termination event preventing storage of new discrete signal chunks of the digital communications signal data, automatically execute the at least one delayed communication action.

8. The one or more non-transitory, computer-readable storage media of claim 1, wherein the instructions further cause the system to:

access, from a remote database, an event compliance schema comprising one or more required signal event categories for the digital communications signal data;

determine, from the first signal event category set, a signal event category subset comprising signal event categories that satisfy the one or more required signal event categories of the event compliance schema; and responsive to failure to detect at least one required signal event category of the event compliance schema in the signal event category subset, transmit, to the second user, an alert indicating deviation of the digital communications signal data from the event compliance schema.

9. The one or more non-transitory, computer-readable storage media of claim 1, wherein the one or more signal modalities can comprise alphanumeric characters, audio signals, visual images, tactile motion information, compressed files, other transmissible signal representations that are interpretable via machine code, or a combination thereof.

10. The one or more non-transitory, computer-readable storage media of claim 1, wherein the digital communications signal data is monitored via a communicative interface accessible between the two or more users, the communicative interface facilitating an audio call, a video conference, an email exchange, a text chat, or a combination thereof.

11. A computing system comprising:

at least one hardware processor; and

57 at least one non-transitory memory storing instructions, which, when executed by the at least one hardware processor, cause the computing system to:

monitor digital communications signal data transmitted among a user set, the digital communications signal data comprising discrete signal chunks of one or more signal modalities;

convert, upon detecting a first timestamp, a first discrete signal chunk of the digital communications signal data into a first alphanumeric signal set, the first discrete signal chunk comprising signal data that corresponds to at least one signal modality of the one or more signal modalities;

input the first alphanumeric signal set into a machine learning model to generate a first scoring g distribution that maps the digital communications signal data to a first signal event category set;

transmit, to an operating user of the user set, a first interventive action that is selected based on the first signal event category set and, when executed by the at least one user, causes a transformation of new signal data from the digital communications signal data;

convert, upon detecting a second timestamp, a second discrete signal chunk of the digital communications signal data into a second alphanumeric signal set, the second discrete signal chunk comprising signal data that corresponds to the at least one signal modality of the one or more signal modalities;

input the second alphanumeric signal set and the first alphanumeric signal set into the machine learning model to generate a second scoring distribution that maps the digital communications signal data to a second signal event category set;

determine a signal event divergence score via comparing the first and the second scoring distributions of the first and the second signal event category sets respectively;

responsive to the signal event divergence score failing to satisfy a tolerance threshold, transmit, to the operating user, a second interventive action that is selected based on the second signal event category set and, when executed by the operating user, causes a different transformation of the digital communications signal data;

selectively identify, based on the first signal event category set, at least one delayed communication action for processing the stored discrete signal chunks after termination of the digital communications signal data; and responsive to detecting a termination event preventing storage of new discrete signal chunks of the digital communications signal data, automatically execute the at least one delayed communication action.

12. The computing system of claim 11, wherein the at least one signal modality is a first signal modality, and wherein the computing system is further caused to:

convert, upon detecting the first timestamp, a signal data subset of the first discrete signal chunk into a third alphanumeric signal set, the signal data subset corresponding to a second signal modality of the one or more signal modalities; and input the first alphanumeric signal set and the third alphanumeric signal set into the machine learning model to generate a third scoring distribution that maps the first discrete signal chunk to a third signal event category set.

13. The computing system of claim 11 further caused to:

generate, via a semantic encoder, an embedded content identifier for a natural-language request that is received from the operating user, the natural-language request comprising a query for information associated with the digital communications signal data;

determine, via comparing the embedded content identifier of the natural-language request to embedded content identifiers of signal data for prior digital communications transmitted among the user set, a historical alphanumeric signal set that corresponds to prior digital communications comprising similar signal data to the digital communications signal data;

input the natural-language request and the historical alphanumeric signal set into a generative machine learning model to output a human-readable narrative that responds to the natural-language request; and transmit for display, via a user interface of the operating user, the human-readable narrative.

14. The computing system of claim 11, wherein the machine learning model is a first machine learning model, and wherein the computing system is further caused to:

input the first alphanumeric signal set into a second machine learning model to generate an affective scoring distribution that maps the first discrete signal chunk to an affective domain set for the user set; and input the first alphanumeric signal set and the affective scoring distribution into the first machine learning model to generate a third scoring distribution that maps the first discrete signal chunk to a third signal event category set.

15. The computing system of claim 11, wherein the machine learning model is a first machine learning model, and wherein the computing system is further caused to:

access, from a remote database, an entity attribute model that maps signal data attributes to one or more categories of distinct entities;

input the first alphanumeric signal set and the entity attribute model into a second machine learning model to generate an entity set that comprises distinct entities corresponding to identified alphanumeric signal subsets of the first alphanumeric signal set; and transmit for display, via a user interface of the operating user, a visual representation of the first alphanumeric signal set, the visual representation comprising graphical mappings between the identified alphanumeric signal subsets and the distinct entities of the entity set.

16. The computing system of claim 11 further caused to:

responsive to detecting, upon detecting a third timestamp, a termination event preventing storage of new discrete signal chunks of the digital communications signal data:

determine a discrete signal chunk set that comprises discrete signal chunks corresponding to timestamps between the first timestamp and the third timestamp;

convert a third discrete signal chunk from the discrete signal chunk set into a third alphanumeric signal set, the third discrete signal chunk comprising signal data that corresponds to the at least one signal modality of the one or more signal modalities;

input the third alphanumeric signal set into a generative machine learning to output a human-readable narrative that summarizes contents of the digital communications signal data between the first and the third timestamps; and transmit for display, via a user interface of the operating user, the human-readable narrative.

17. The system of claim 11 further caused to:

access, from a remote database, an event compliance schema comprising one or more required signal event categories for the digital communications signal data;

determine, from the first signal event category set, a signal event category subset comprising signal event categories that satisfy the one or more required signal event categories of the event compliance schema; and responsive to failure to detect at least one required signal event category of the event compliance schema in the signal event category subset, transmit, to the operating user, an alert indicating deviation of the digital communications signal data from the event compliance schema.

18. A computer-implemented method for a signal-to-event conversion platform, the method comprising:

monitoring digital communications signal data transmitted among a user set, the digital communications signal data comprising a discrete signal chunk set of one or more signal modalities; and responsive to detecting a first discrete signal chunk not found within the discrete signal chunk set of the monitored digital communications signal data:

converting signal data of the first discrete signal chunk into a first alphanumeric signal set, the signal data corresponding to at least one signal modality of the one or more signal modalities;

inputting the first alphanumeric signal set into a machine learning model to generate a first scoring distribution that maps the digital communications signal data to a first signal event category set;

retrieving, for a second discrete signal chunk within the discrete signal chunk set, a second alphanumeric signal set and a second scoring distribution that maps the digital communications signal data to a second signal event category set;

determining a signal event divergence score via comparing the first and the second scoring distributions of the first and the second signal event category sets respectively;

when the signal event divergence score fails to satisfy a tolerance threshold, transmitting, to at least one user of the user set, an interventive action that is selected based on the first signal event category set and, when executed by the at least one user, causes a transformation of the digital communications signal data;

selectively identifying, based on the first signal event category set, at least one delayed communication action for processing the discrete signal chunks after termination of the digital communications signal data; and responsive to detecting a termination event preventing storage of new discrete signal chunks of the digital communications signal data, automatically executing the at least one delayed communication action.

19. The computer-implemented method of claim 18, wherein the machine learning model is a first machine learning model, and wherein the computer-implemented method further comprises:

inputting the first alphanumeric signal set into a second machine learning model to generate an affective scoring distribution that maps the first discrete signal chunk to an affective domain set for the user set; and inputting the first alphanumeric signal set and the affective scoring distribution into the first machine learning model to generate a third scoring distribution that maps the first discrete signal chunk to a third signal event category set.

20. The computer-implemented method of claim 18 further comprising:

selectively identifying, based on the first signal event category set, at least one delayed communication action for processing the discrete signal chunks after termination of the digital communications signal data; and responsive to detecting a termination event preventing storage of new discrete signal chunks of the digital communications signal data, automatically executing the at least one delayed communication action.

* * * * *